(12) United States Patent
Tanaka et al.

(10) Patent No.: US 11,236,907 B2
(45) Date of Patent: Feb. 1, 2022

(54) EXHAUST GAS TREATMENT DEVICE AND EXHAUST GAS TREATMENT METHOD

(71) Applicant: Mitsubishi Heavy Industries Engineering, Ltd., Kanagawa (JP)

(72) Inventors: Hiroshi Tanaka, Tokyo (JP); Takuya Hirata, Tokyo (JP); Takashi Kamijo, Tokyo (JP); Tatsuya Tsujiuchi, Tokyo (JP)

(73) Assignee: Mitsubishi Heavy Industries Engineering, Ltd., Yokohama (JP)

( * ) Notice: Subject to any disclaimer, the term of this patent is extended or adjusted under 35 U.S.C. 154(b) by 565 days.

(21) Appl. No.: 16/321,977

(22) PCT Filed: Feb. 20, 2018

(86) PCT No.: PCT/JP2018/005945
§ 371 (c)(1),
(2) Date: Jan. 30, 2019

(87) PCT Pub. No.: WO2019/162992
PCT Pub. Date: Aug. 29, 2019

(65) Prior Publication Data
US 2021/0356128 A1 Nov. 18, 2021

(51) Int. Cl.
*F23R 3/40* (2006.01)
*F01K 23/10* (2006.01)
(Continued)

(52) U.S. Cl.
CPC .............. *F23R 3/40* (2013.01); *B01D 53/343* (2013.01); *B01D 53/62* (2013.01); *B01D 53/78* (2013.01);
(Continued)

(58) Field of Classification Search
CPC ...... B01D 53/56; B01D 53/565; B01D 53/62; B01D 53/74; B01D 53/75; B01D 53/8625;
(Continued)

(56) References Cited

U.S. PATENT DOCUMENTS

| 8,728,423 B2 | 5/2014 | Iijima et al. |
| 2009/0252659 A1 | 10/2009 | Iijima et al. |
| 2014/0373720 A1 | 12/2014 | Nakagawa et al. |

FOREIGN PATENT DOCUMENTS

| JP | 2004-019484 A | 1/2004 |
| JP | 5291449 B2 | 9/2013 |

OTHER PUBLICATIONS

First Examination Report in corresponding Indian Application No. 201917003325, dated Sep. 18, 2020 (5 pages).
(Continued)

*Primary Examiner* — Timothy C Vanoy
(74) *Attorney, Agent, or Firm* — Osha Bergman Watanabe & Burton LLP

(57) ABSTRACT

An exhaust gas treatment device includes an exhaust gas line where a combustion exhaust gas discharged from a power generation facility flows through, an exhaust gas line where a second combustion exhaust gas discharged from a second power generation facility flows through, exhaust gas exhaust line disposed by branching off from exhaust gas line, discharging a part of combustion exhaust gases as exhaust combustion exhaust gases, a nitrogen oxide removing unit removing nitrogen oxide contained in an integrated combustion exhaust gas that integrates the combustion exhaust gases, an integrated waste heat recovery boiler recovering waste heat from the integrated combustion exhaust gas, and a $CO_2$ recovery unit recovering $CO_2$ contained in the integrated combustion exhaust gas by using $CO_2$ absorbing liquid.

16 Claims, 7 Drawing Sheets

(51) Int. Cl.
  *B01D 53/34* (2006.01)
  *B01D 53/62* (2006.01)
  *B01D 53/78* (2006.01)
  *B01D 53/86* (2006.01)
  *B01D 53/90* (2006.01)
(52) U.S. Cl.
  CPC ..... *B01D 53/8625* (2013.01); *B01D 53/8696* (2013.01); *B01D 53/90* (2013.01); *F01K 23/101* (2013.01); B01D 2257/404 (2013.01); B01D 2257/504 (2013.01); B01D 2258/0283 (2013.01)
(58) Field of Classification Search
  CPC ........ B01D 2257/404; B01D 2257/504; B01D 2258/01; B01D 2258/0283; F01N 3/0857; F01N 3/2066; F01N 5/00; F01N 2250/12; F01N 2570/10; F01N 2570/14; Y02C 20/40; Y02E 20/32
  See application file for complete search history.

(56) References Cited

OTHER PUBLICATIONS

Extended European Search Report in corresponding European Application No. 18 833 145.8, dated Aug. 31, 2021 (9 pages).

EXHAUST GAS TREATMENT DEVICE AND EXHAUST GAS TREATMENT METHOD

TECHNICAL FIELD

The present invention relates to an exhaust gas treatment device and an exhaust gas treatment method, and for example, relates to the exhaust gas treatment device and the exhaust gas treatment method that treat a combustion exhaust gas discharged from a power generation facility.

BACKGROUND ART

In the past, there has been proposed an exhaust gas treatment device including a plurality of exhaust gas flow paths which are connected to a plurality of gas turbines and includes a waste heat recovery boiler recovering waste heat of combustion exhaust gas discharged from the gas turbines (see Patent Document 1, for example). In the exhaust gas treatment device, the waste heat of the combustion exhaust gas discharged from each gas turbine is recovered by the waste heat recovery boiler provided to each exhaust gas flow path. Then, the combustion exhaust gas, from which the waste heat has been recovered, in each of the exhaust gas flow paths is integrated into an integrated combustion exhaust gas, and thereafter, carbon dioxide ($CO_2$) in the integrated combustion exhaust gas is recovered by a $CO_2$ absorbing liquid in a $CO_2$ recovery device.

CITATION LIST

Patent Documents

Patent Document 1: JP 5291449 B

SUMMARY OF INVENTION

Problem to be Solved by the Invention

Here, in the exhaust gas treatment device, a component derived from nitrogen oxide contained the combustion exhaust gas (for example, nitrogen dioxide ($NO_2$)) accumulates as an accumulated component in the $CO_2$ absorbing liquid, and therefore, a nitrogen oxide removal device is provided for removing nitrogen oxide in the exhaust gas on a front stage of the $CO_2$ recovery device. On the other hand, in a case of the gas turbine in a low power load during the operation, an amount of discharged nitrogen oxide contained in the combustion exhaust gas remarkably increases, and thus the nitrogen oxide removal device provided at the front stage of the $CO_2$ recovery device may not sufficiently remove nitrogen oxide contained in the combustion exhaust gas.

The remaining nitrogen oxide contained in the combustion exhaust gas may cause the accumulation of the accumulating components originated from nitrogen oxide in the $CO_2$ absorbing liquid of the $CO_2$ recovery device, and may increase frequency of the reclaiming treatment that removes accumulating components originated from nitrogen oxide from the $CO_2$ absorbing liquid. This may result in increase of the operation cost.

The present invention has an object to provide an exhaust gas treatment device and an exhaust gas treatment method capable of reducing an accumulation amount of components originated from nitrogen oxide in the $CO_2$ absorbing liquid and capable of reducing the operation cost.

Solution to Problem

An exhaust gas treatment device according to the present invention includes a first exhaust gas flow path where a first combustion exhaust gas discharged from a first power generation facility flows through; a second exhaust gas flow path where a second combustion exhaust gas discharged from a second power generation facility flows through; an exhaust gas exhaust flow path disposed by branching off from at least one of the first exhaust gas flow path and the second exhaust gas flow path, and configured to discharge an exhaust combustion exhaust gas, the exhaust combustion exhaust gas including at least a part of at least one of the first combustion exhaust gas flowing through the first exhaust gas flow path and the second combustion exhaust gas flowing through the second exhaust gas flow path; a nitrogen oxide removing unit configured to remove nitrogen oxide contained in an integrated combustion exhaust gas obtained by integrating the first combustion exhaust gas flowing through the first exhaust gas flow path with the second combustion exhaust gas flowing through the second exhaust gas flow path; an integrated waste heat recovery unit configured to recover waste heat from the integrated combustion exhaust gas with nitrogen oxide removed by the nitrogen oxide removing unit; and a $CO_2$ recovery unit configured to recover $CO_2$ contained in the integrated combustion exhaust gas by using $CO_2$ absorbing liquid, the waste heat of the integrated combustion exhaust gas being recovered by the integrated waste heat recovery unit.

This configuration can, in a case where nitrogen oxide contained in the combustion exhaust gas discharged from at least one of the first power generation facility and the second power generation facility increases, discharge at least one of the first combustion exhaust gas and the second combustion exhaust gas, in which the concentration of nitrogen oxide increases, outside through the exhaust gas exhaust flow path. This enables the exhaust gas treatment device to adjust the concentration of nitrogen oxide contained in the integrated combustion exhaust gas introduced to the nitrogen oxide removing unit in the range suitable for the nitrogen oxide decomposition treatment so that the exhaust gas treatment device can efficiently decompose and remove nitrogen oxide in the integrated combustion exhaust gas.

Thus, the exhaust gas treatment device can reduce the amount of components originated from nitrogen oxide accumulated in the $CO_2$ absorbing liquid and can reduce the operation cost therefor.

The exhaust gas treatment device according to the present invention preferably includes an exhaust gas waste heat recovery unit configured to recover the waste heat from the exhaust combustion exhaust gas flowing through the exhaust gas exhaust flow path. This configuration allows the exhaust gas treatment device to recover the waste heat from the combustion exhaust gas flowing through at least one of the first exhaust gas flow path and the second exhaust gas flow path at the exhaust gas waste heat recovery unit. Thus, the exhaust gas treatment device can effectively use the waste heat from the first combustion exhaust gas and the second combustion exhaust gas.

The exhaust gas treatment device according to the present invention preferably includes a control unit configured to control a flow rate of the first combustion exhaust gas and the second combustion exhaust gas both introduced to the integrated waste heat recovery unit. This configuration allows the exhaust gas treatment device to control the flow rate of the first combustion exhaust gas and the second combustion exhaust gas introduced to the integrated waste heat recovery unit to discharge at least a part of the first combustion exhaust gas and second combustion exhaust gas discharged at least from one of the first power generation facility and the second power generation facility both at low power load operation, outside. This enables the exhaust gas treatment device to easily adjust the concentration of nitrogen oxide contained in the integrated combustion exhaust gas introduced to the nitrogen oxide removing unit in the range suitable for the nitrogen oxide decomposition treatment.

In the exhaust gas treatment device according to the present invention, the control unit preferably controls, based on power loads of the first power generation facility and the second power generation facility, the flow rate of the first combustion exhaust gas and the second combustion exhaust gas both introduced to the integrated waste heat recovery unit. This configuration allows the exhaust gas treatment device to discharge at least a part of the first combustion exhaust gas and second combustion exhaust gas discharged at least from one of the first power generation facility and the second power generation facility both at low power load operation, outside. This enables the exhaust gas treatment device to easily adjust the concentration of nitrogen oxide contained in the integrated combustion exhaust gas introduced to the nitrogen oxide removing unit in the range suitable for the nitrogen oxide decomposition treatment.

In the exhaust gas treatment device according to the present invention, the control unit preferably controls, based on the power outputs of the first power generation facility and the second power generation facility as the power load, the flow rate of the first combustion exhaust gas and the second combustion exhaust gas both introduced to the integrated waste heat recovery unit. This configuration allows the exhaust gas treatment device to discharge at least a part of the first combustion exhaust gas and second combustion exhaust gas discharged at least from one of the first power generation facility and the second power generation facility both at low power output operation, outside. This enables the exhaust gas treatment device to easily adjust the concentration of nitrogen oxide contained in the integrated combustion exhaust gas introduced to the nitrogen oxide removing unit in the range suitable for the nitrogen oxide decomposition treatment.

In the exhaust gas treatment device according to the present invention, the control unit preferably controls the flow rate of the first combustion exhaust gas and the second combustion exhaust gas both introduced to the integrated waste heat recovery unit, based on at least one of the flow rate of the first combustion exhaust gas flowing through the first exhaust gas flow path, the flow rate of the second combustion exhaust gas flowing through the second exhaust gas flow path, and the flow rate of the exhaust combustion exhaust gas flowing through the exhaust gas exhaust flow path, as the power loads. This configuration allows the exhaust gas treatment device to discharge at least a part of the first combustion exhaust gas and the second combustion exhaust gas discharged at least from one of the first power generation facility and the second power generation facility, in which the flow rate of the first combustion exhaust gas and the second combustion exhaust gas may be reduced, outside. This enables the exhaust gas treatment device to easily adjust the concentration of nitrogen oxide contained in the integrated combustion exhaust gas introduced to the nitrogen oxide removing unit in the range suitable for the nitrogen oxide decomposition treatment.

In the exhaust gas treatment device according to the present invention, the control unit preferably controls, based on an exhaust gas load calculated using Equation (1) below in a case where the power load is equal to or less than a predetermined threshold value, the flow rate of the first combustion exhaust gas and the second combustion exhaust gas both introduced to the integrated waste heat recovery unit. This configuration allows the exhaust gas treatment unit to control, based on the exhaust gas load, the flow rate of the first combustion exhaust gas and the second combustion exhaust gas introduced to the integrated waste heat recovery unit to discharge at least a part of the first combustion exhaust gas and second combustion exhaust gas discharged at least from one of the first power generation facility and the second power generation facility both at low exhaust gas load operation, outside. This enables the exhaust gas treatment device to easily adjust the concentration of nitrogen oxide contained in the integrated combustion exhaust gas introduced to the nitrogen oxide removing unit in the range suitable for the nitrogen oxide decomposition treatment.

$$\text{Exhaust gas load (\%)} = \text{Flow rate of the first combustion exhaust gas or the second combustion exhaust gas flowing through the first exhaust gas flow path or the second exhaust gas flow path to be measured/Full load flow rate of the first combustion exhaust gas or the second combustion exhaust gas flowing through the first exhaust gas flow path or the second exhaust gas flow path} \times 100 \quad \text{Equation (1)}$$

The exhaust gas treatment device according to the present invention preferably includes a control unit configured to adjust the flow rate of the first combustion exhaust gas and the second combustion exhaust gas introduced to the nitrogen oxide removing unit to control temperatures of the integrated combustion exhaust gas to be 300° C. or higher and 400° C. or lower. This configuration can control the gas temperature of the integrated combustion exhaust gas introduced to the nitrogen oxide removing unit to be 300° C. or higher and 400° C. or lower suitable for the nitrogen oxide decomposition treatment. Thus, the exhaust gas treatment device can efficiently reduce the amount of components originated from nitrogen oxide accumulated in the $CO_2$ absorbing liquid of the $CO_2$ recovery unit.

In the exhaust gas treatment device according to the present invention, the nitrogen oxide removing unit is preferably disposed in the integrated waste heat recovery unit. This configuration can integrate the integrated waste heat recovery unit with the nitrogen oxide removing unit. Thus, the exhaust gas treatment device can be small and simplified.

In the exhaust gas treatment device according to the present invention, the nitrogen oxide removing unit preferably includes a nitrogen oxide removing catalyst removing nitrogen oxide and a reducing agent injecting unit injecting a reducing agent. With this configuration, the exhaust gas treatment device can further efficiently decompose and remove nitrogen oxide contained in the integrated combustion gas by using the reducing agent and nitrogen oxide removing catalyst.

The exhaust gas treatment device according to the present invention preferably includes a control unit configured to control supply amount of the reducing agent, based on the gas flow rate and the concentration of nitrogen oxide of the integrated combustion exhaust gas introduced to the $CO_2$ recovery unit. This configuration can control the concentration of nitrogen oxide contained in the integrated combustion exhaust gas introduced to the $CO_2$ recovery unit in the desired range.

In the exhaust gas treatment device according to the present invention, the integrated waste heat recovery unit preferably forms steam for driving a $CO_2$ compression portion by using the waste heat from the integrated combustion exhaust gas with nitrogen oxide removed, the $CO_2$ compression portion compressing $CO_2$ discharged from the $CO_2$ recovery unit, and supplies the formed steam for driving $CO_2$ compression portion to the $CO_2$ compression portion. This configuration can efficiently use the waste heat from the integrated combustion exhaust gas as the steam for driving $CO_2$ compression portion. Thus, the exhaust gas treatment device can reduce the operation cost.

In the exhaust gas treatment device according to the present invention, the integrated waste heat recovery unit preferably forms steam for driving turbine by the waste heat from the integrated combustion exhaust gas with nitrogen oxide removed, and supplies the formed steam for driving turbine to a steam turbine. This configuration can efficiently use the waste heat from the integrated combustion exhaust gas as the steam for driving the turbine, and thus, the exhaust gas treatment device can reduce the operation cost.

The exhaust gas treatment device according to the present invention preferably includes a control unit that measures the temperature and gas flow rate of the integrated combustion exhaust gas introduced into the nitrogen oxide removal unit, and controls at least one of a rate of a fuel supplied to a combustor in the power-generating facility and a rate of the steam supplied to the steam turbine based on the measured temperature and gas flow rate. This configuration enables the exhaust gas treatment device to control the temperature and the flow rate of the integrated combustion exhaust gas introduced to the nitrogen oxide removing unit in the desired range.

In the exhaust gas treatment device according to the present invention, at least one of the first power generation facility and the second power generation facility includes an existing power generation facility. This configuration allows even existing power generation facilities to adjust the concentration of nitrogen oxide contained in the integrated combustion exhaust gas in the range suitable for the nitrogen oxide decomposition and removal by disposing the first exhaust gas flow path and the second exhaust gas flow path. Thus, the increase of the facility cost can be suppressed.

An exhaust gas treatment method according to the present invention includes steps of: discharging, in a case where at least one of power loads of a first power generation facility and a second power generation facility is less than a predetermined threshold value, at least a part of a first combustion exhaust gas discharged from the first power generation facility and a second combustion exhaust gas discharged from the second power generation facility, the power load of the first power generation facility and the second power generation facility being less than the predetermined threshold value to outside; integrating the first combustion exhaust gas and the second combustion exhaust gas into an integrated combustion exhaust gas, at least a part of the first combustion exhaust gas and the second combustion exhaust gas being discharged to outside, and removing nitrogen oxide contained in the integrated combustion exhaust gas; recovering waste heat from the integrated combustion exhaust gas with nitrogen oxide removed; and recovering $CO_2$ contained in the integrated combustion exhaust gas with the waste heat recovered, by using a $CO_2$ absorbing liquid.

This method can, in a case where nitrogen oxide contained in the combustion exhaust gas discharged from at least one of the first power generation facility and the second power generation facility increases, discharge at least one of the first combustion exhaust gas and the second combustion exhaust gas, in which the concentration of nitrogen oxide increases, outside. This enables the exhaust gas treatment device to adjust the concentration of nitrogen oxide contained in the integrated combustion exhaust gas in the range suitable for the nitrogen oxide decomposition treatment so that the exhaust gas treatment device can efficiently decompose and remove nitrogen oxide in the integrated combustion exhaust gas. Thus, the exhaust gas treatment method can reduce the amount of components originated from nitrogen oxide accumulated in the $CO_2$ absorbing liquid and can reduce the operation cost therefor.

Advantageous Effect of Invention

Thus, according to the present invention, the exhaust gas treatment device and method can reduce the amount of components originated from nitrogen oxide accumulated in the $CO_2$ absorbing liquid and can reduce the operation cost therefor.

DESCRIPTION OF EMBODIMENTS

The inventors have focused on a matter that exhaust gas treatment devices of related art remarkably increase an amount of nitrogen oxide contained in a combustion exhaust gas discharged from a power generation facility in a case of the power generation facility at low power load operation. The inventors then have conceived an idea to discharge the combustion exhaust gas with increased amount of nitrogen oxide from the power generation facility at low power load operation among a plurality of power generation facilities through an exhaust gas exhaust flow path. The inventors have found that the above idea can reduce the concentration of nitrogen oxide contained in an integrated combustion exhaust gas into which combustion exhaust gases discharged from the plurality of power generation facilities are integrated, reduce the accumulation amount of components originated from nitrogen oxide in $CO_2$ absorbing liquid, and reduce the operation cost as well. As a result, the inventors have finalized the present invention.

Hereinafter, embodiments of the present invention will be described in detail while referring to the attached drawings. Note that the present invention is not limited to the following embodiments and the present invention can be carried out by applying suitable modifications.

Figure 1:
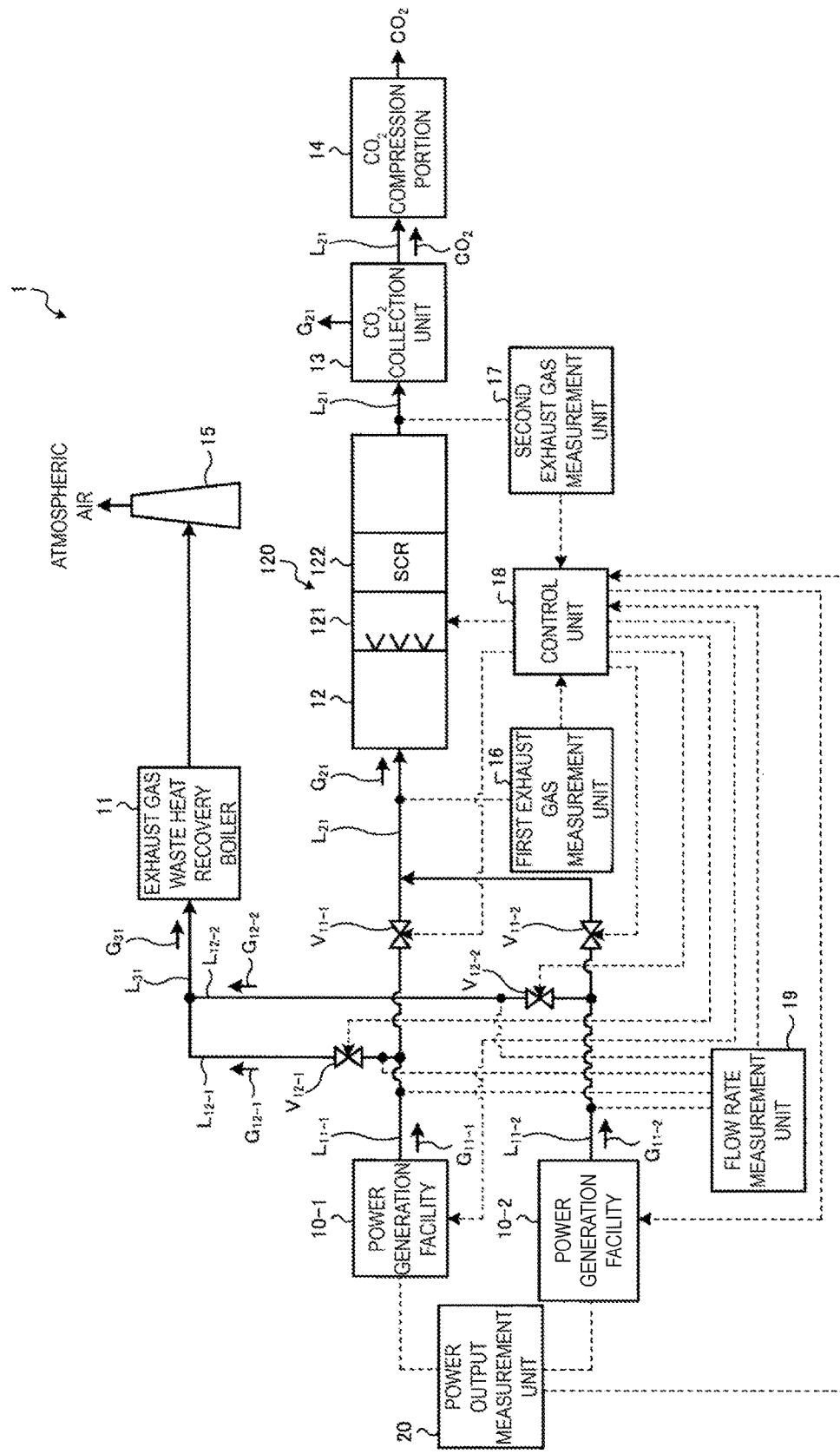
FIG. 1 is a schematic diagram illustrating an example of an exhaust gas treatment device according to an embodiment of the present invention.

FIG. 1 is a schematic diagram illustrating an example of the exhaust gas treatment device according to the embodiment of the present invention. As illustrated in FIG. 1, the exhaust gas treatment device 1 according to the present embodiment recovers waste heat from a combustion exhaust gas (a first combustion exhaust gas) $G_{11-1}$ discharged from a power generation facility (a first power generation facility) 10-1 that produces a combustion exhaust gas $G_{11}$, and waste heat from a combustion exhaust gas (a second combustion exhaust gas) $G_{11-2}$ discharged from a power generation facility (a second power generation facility) 10-2 at an integrated waste heat recovery boiler 12. The exhaust gas treatment device 1 then recovers $CO_2$ contained in an integrated combustion exhaust gas G21 by a $CO_2$ recovery unit 13 to be discharged. The exhaust gas treatment device 1 includes the power generation facility 10-1 discharging the combustion exhaust gas $G_{11-1}$, the power generation facility 10-2 discharging combustion exhaust gas $G_{11-2}$, an exhaust gas waste heat recovery boiler 11 and an integrated waste heat recovery boiler 12 disposed at a downstream stage of the power generation facility 10-1 in a flow direction of the combustion exhaust gas $G_{11}$, the $CO_2$ recovery unit 13 disposed at a downstream stage of the integrated waste heat recovery boiler 12, and a $CO_2$ compression portion 14 disposed at a downstream stage of the $CO_2$ recovery unit 13. A stack 15 discharging a part of the combustion exhaust gas $G_{11}$ is disposed at a downstream stage of the exhaust gas waste heat recovery boiler 11.

Figure 2:
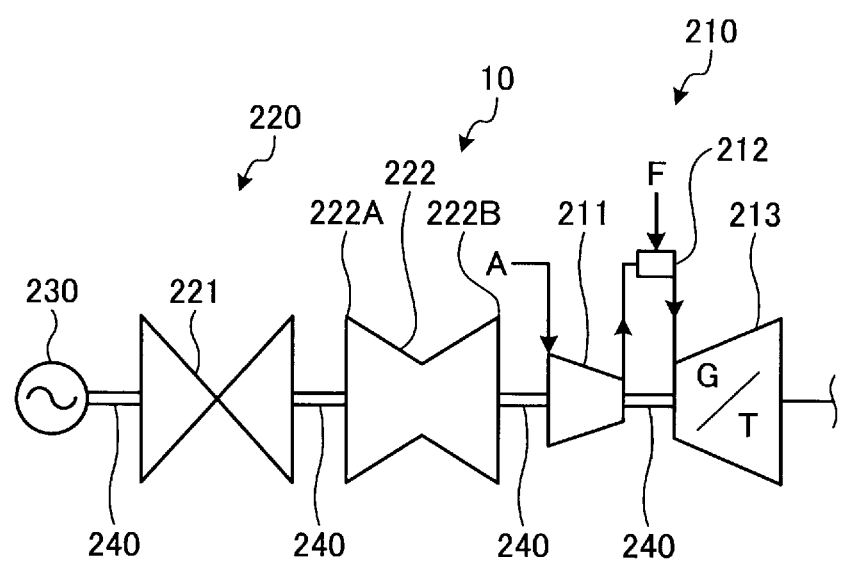
FIG. 2 is a schematic diagram of a power generation facility according to the embodiment of the present invention.

FIG. 2 is a schematic diagram of power generation facilities 10-1, 10-2 according to the present embodiment. Note that both the power generation facilities 10-1, 10-2 includes the same configuration, and are illustrated as a power generation facility 10 in FIG. 2. As illustrated in FIG. 2, the power generation facility 10 is a single-shaft type combined power generation facility (gas turbine combined cycle) in which a gas turbine 210, a steam turbine 220, and a generator 230 are aligned in a single shaft. The gas turbine 210 includes a compressor 211 compressing an air A, a combustor 212 combusting a fuel F with the air A compressed at the compressor, and a turbine 213 rotationally driven by the combustion gas produced at the combustor 212. The compressor 211 and the turbine 213 are connected via a turbine shaft 240.

The steam turbine 220 includes a low-pressure steam turbine 221 that is rotationally driven by a low-pressure steam, and a medium-pressure/high-pressure steam turbine 222 in which a mid-pressure steam turbine 222A that is rotationally driven by a medium-pressure steam is connected to a high-pressure steam turbine 222B that is rotationally driven by a high-pressure steam. The low-pressure steam turbine 221 and the medium-pressure/high-pressure steam turbine 222 are connected to the generator 230 and the gas turbine 210 via the turbine shaft 240. The generator 230 generates power by the rotational drive of the gas turbine 210 and the steam turbine 220 via the turbine shaft 240.

The power generation facility 10-1 discharges the combustion exhaust gas $G_{11-1}$ produced by the power generation to an exhaust gas line (the first exhaust gas flow path) $L_{11-1}$. The exhaust gas line $L_{11-1}$ supplies the combustion exhaust gas $G_{11-1}$ discharged from the power generation facility 10-1 to the integrated waste heat recovery boiler 12. The exhaust gas line $L_{11-1}$ includes a flow rate control valve $V_{11-1}$ to adjust the flow rate of the combustion exhaust gas $G_{11-1}$ flowing through the exhaust gas line $L_{11-1}$. Further, the exhaust gas line $L_{11-1}$ includes an exhaust gas exhaust line (an exhaust gas exhaust flow path) $L_{12-1}$ between the power generation facility 10-1 and the integrated waste heat recovery boiler 12 and at a downstream stage the flow rate control valve $V_{11-1}$. The exhaust gas exhaust line (an exhaust gas exhaust flow path) $L_{12-1}$ branches off from the exhaust gas line $L_{11-1}$. This exhaust gas exhaust line $L_{12-1}$ includes a flow rate control valve $V_{12-1}$, the exhaust gas waste heat recovery boiler 11 and the stack 15 in this order. The flow rate control valve $V_{12-1}$ adjusts the flow rate of the exhaust combustion exhaust gas $G_{12-1}$ flowing through the exhaust gas exhaust line $L_{12-1}$. The exhaust gas waste heat recovery boiler 11 recovers the waste heat from the exhaust combustion exhaust gas $G_{12-1}$ flowing through the exhaust gas exhaust line $L_{12-1}$, and supplies the exhaust combustion exhaust gas $G_{12-1}$ with the waste heat recovered to the stack 15. The stack 15 discharges the exhaust combustion exhaust gas $G_{12-1}$ with the waste heat recovered outside. Disposing the exhaust gas waste heat recovery boiler 11 is not always necessary.

The power generation facility 10-2 discharges the combustion exhaust gas $G_{11-2}$ produced by the power generation to the exhaust gas line (the second exhaust gas flow path) $L_{11-2}$. The exhaust gas line $L_{11-2}$ supplies the combustion exhaust gas $G_{11-2}$ discharged from the power generation facility 10-2 to the integrated waste heat recovery boiler 12. The exhaust gas line $L_{11-2}$ includes a flow rate control valve $V_{11-2}$ to adjust the flow rate of the combustion exhaust gas $G_{11-1}$ flowing through the exhaust gas line $L_{11-1}$. Further, the exhaust gas line $L_{11-2}$ includes an exhaust gas exhaust line (an exhaust gas exhaust flow path) $L_{12-2}$ between the power generation facility 10-2 and the integrated waste heat recovery boiler 12 and at a downstream stage the flow rate control valve $V_{11-1}$. This exhaust gas exhaust line $L_{12-2}$ includes a flow rate control valve $V_{12-2}$ that adjusts the flow rate of the exhaust combustion exhaust gas $G_{12-2}$ flowing through the exhaust gas exhaust line $L_{12-2}$. The exhaust gas exhaust line $L_{12-2}$ is connected to the exhaust gas exhaust line $L_{12-1}$ to form an integrated exhaust gas exhaust line $L_{31}$.

The integrated waste heat recovery boiler 12 is supplied with the integrated combustion exhaust gas G21 in which the combustion exhaust gas $G_{11-1}$ flowing through the exhaust gas line $L_{11-1}$ and the combustion exhaust gas $G_{11-2}$ flowing through the exhaust gas line $L_{11-2}$ are integrated. The integrated waste heat recovery boiler 12 recovers the waste heat of the integrated combustion exhaust gas G21. The integrated waste heat recovery boiler 12 is provided with, within thereof, a nitrogen oxide removal unit 120 that reduces and removes nitrogen oxide such as nitrogen monoxide and nitrogen dioxide contained in the integrated combustion exhaust gas G21. In this way, by providing the nitrogen oxide removal unit 120 within the integrated waste heat recovery boiler 12, the exhaust gas treatment device 1 can be reduced in size. Note that the nitrogen oxide removal unit 120 may not be necessarily provided in an integrated form with the integrated waste heat recovery boiler 12, and may be provided outside the integrated waste heat recovery boiler 12.

The nitrogen oxide removal unit 120 includes a reducing agent supply unit 121 that injects a reducing agent into the integrated combustion exhaust gas G21 to reduce nitrogen oxide, and a selective catalytic reduction (SCR) unit 122 that is provided on a downstream stage of the reducing agent supply unit 121 and filled with a DeNOx catalyst selectively reducing nitrogen oxide. The reducing agent in the reducing agent supply unit 121 is not specifically limited so long as it can decompose and remove nitrogen oxide such as nitrogen monoxide and nitrogen dioxide. The DeNOx catalyst in the selective catalytic reduction unit 122 is not specifically limited so long as it can decompose and remove nitrogen oxide such as nitrogen monoxide and nitrogen dioxide.

The integrated waste heat recovery boiler 12, in the nitrogen oxide removal unit 120, supplies the reducing agent from the reducing agent supply unit 121 to the integrated combustion exhaust gas G21, and performs a decomposition treatment by the selective catalytic reduction unit 122 on nitrogen oxide supplied with the reducing agent. The integrated waste heat recovery boiler 12 recovers the waste heat of the integrated combustion exhaust gas G21 of which nitrogen oxide has undergone the decomposition treatment, and supplies the integrated combustion exhaust gas G21 from which the waste heat has been recovered to the $CO_2$ recovery unit 13.

The $CO_2$ recovery unit 13 includes a $CO_2$ absorbing tower that absorbs carbon dioxide ($CO_2$) in the integrated combustion exhaust gas G21 by the $CO_2$ absorbing liquid, and a $CO_2$ regeneration tower that heats the $CO_2$ absorbing liquid having absorbed $CO_2$ to release $CO_2$ from the $CO_2$ absorbing liquid. A $CO_2$ absorbing liquid is not specifically limited so long as it can recover carbon dioxide ($CO_2$) in the integrated combustion exhaust gas G21, and an amine series absorbing liquid can be used, for example. The $CO_2$ recovery unit 13 discharges, to outside, the integrated combustion exhaust gas $G21_1$ from which $CO_2$ has been recovered, and supplies the recovered $CO_2$ to the $CO_2$ compression portion 14. The $CO_2$ compression portion 14 compresses and discharges $CO_2$ supplied from the $CO_2$ recovery unit 13.

Further, the exhaust gas treatment device 1 includes: a first exhaust gas measurement unit 16 that measures the gas flow rate and temperature of the integrated combustion exhaust gas G21 introduced to the integrated waste heat recovery boiler 12; a second exhaust gas measurement unit 17 that measures the gas flow rate and the concentration of nitrogen oxide of the integrated combustion exhaust gas G21 introduced to the $CO_2$ recovery unit 13; a control unit 18 that controls the flow rate of the combustion exhaust gases $G_{11-1}$ and $G_{11-2}$ both introduced to the integrated waste heat recovery boiler 12, the amount of a fuel F supplied to the power generation facility 10, and the amount of a reducing agent supplied to the integrated combustion exhaust gas G21 from a reducing agent supplying unit 121; a flow rate measurement unit 19 that measures the flow rate of combustion exhaust gases $G_{11-1}$ and $G_{11-2}$ respectively flowing through the exhaust gas lines $L_{11-1}$ and $L_{11-2}$, and the flow rate of the exhaust combustion exhaust gases $G_{12-1}$ and $G_{12-2}$ respectively flowing through the exhaust gas exhaust lines $L_{12-1}$ and $L_{12-2}$; and an output measurement unit 20 that measures the power output of the power generation facilities 10-1 and 10-2. Measurements are performed by a known method, the measurements including a gas flow rate and temperature measurement by the first exhaust gas measurement unit 16; a gas flow rate and concentration of nitrogen oxide measurement by the second exhaust gas measurement unit 17; a measurement of flow rates of the combustion exhaust gases $G_{11-1}$ and $G_{11-2}$ and the exhaust combustion exhaust gases $G_{12-1}$ and $G_{12-2}$ by the flow rate measurement unit 19; and a measurement of power outputs of the power generation facilities 10-1 and 10-2 by the output measurement unit 20.

The control unit 18 adjusts the opening amount of the flow rate control valves $V_{11-1}$, $V_{11-2}$, $V_{12-1}$, and $V_{12-2}$ and the amount of fuel supplied to the power generation facility 10, based on the gas flow rate and temperature of the integrated combustion exhaust gas G21 measured by the first exhaust gas measurement unit 16. Further, the control unit 18 controls the flow rate of the combustion exhaust gases $G_{11-1}$ and $G_{11-2}$ introduced to the integrated waste heat recovery boiler 12, based on at least one of: the flow rate of the combustion exhaust gas $G_{11-1}$ flowing through the exhaust gas line $L_{11-1}$; the flow rate of the combustion exhaust gas $G_{11-2}$ flowing through the exhaust gas line $L_{11-2}$; the flow rate of the exhaust combustion exhaust gas $G_{12-1}$ flowing through the exhaust gas exhaust line $L_{12-1}$; the flow rate of the exhaust combustion exhaust gas $G_{12-2}$ flowing through the exhaust gas exhaust line $L_{12-2}$; and the power output of each of the power generation facilities 10-1, and 10-2. The control unit 18 controls the amount of the fuel F supplied to the power generation facility 10, based on the amount of the gas flow rate and the concentration of nitrogen oxide of the integrated combustion exhaust gas G21 measured by the second exhaust gas measurement unit 17.

The control unit 18 adjusts the opening amount of the flow rate control valves $V_{11-1}$, $V_{11-2}$, $V_{12-1}$, and $V_{12-2}$, based on the power load on the power generation facilities 10-1 and 10-2 to control the flow rate of the exhaust combustion exhaust gases $G_{12-1}$ and $G_{12-2}$ flowing through the exhaust gas exhaust lines $L_{12-1}$ and $L_{12-2}$.

The control unit 18 controls at least one of operations of reducing the opening amount of the flow rate control valve $V_{11-1}$ and increasing the opening amount of the flow rate control valve $V_{12-1}$, in a case where, as an example of the power load, the power output of the power generation facility 10-1 measured at the output measurement unit 20 is less than the preset predetermined threshold value. This operation can discharge the combustion exhaust gas $G_{11-1}$, in which the concentration of nitrogen oxide increases due to the reduction of the power output, as the exhaust combustion exhaust gas $G_{12-1}$. The operation can reduce the concentration of nitrogen oxide contained in the integrated combustion exhaust gas G21. Thus, this can reduce the amount of nitrogen oxide introduced in the integrated waste heat recovery boiler 12. As a result, the $CO_2$ recovery unit 13 enables $CO_2$ absorbing liquid to reduce the accumulation amount of components originated from nitrogen oxide. The control unit 18, in a case where the power output of the power generation facility 10-1 is not less than the preset predetermined threshold value, controls at least one of operations: increasing the opening amount of the flow rate control valve $V_{11-1}$ and reducing the opening amount of the flow rate control valve $V_{12-1}$. This operation can introduce the exhaust combustion exhaust gas $G_{12-1}$ with the concentration of nitrogen oxide reduced due to the increase of the power output, as the combustion exhaust gas $G_{11-1}$ to the integrated waste heat recovery boiler 12. Thus, the integrated waste heat recovery boiler 12 can increase the amount of the waste heat recovered.

The control unit 18 controls at least one of operations of reducing the opening amount of the flow rate control valve $V_{11-2}$ and increasing the opening amount of the flow rate control valve $V_{12-2}$, in a case where, as an example of the power load, the power output of the power generation facility 10-2 measured at the output measurement unit 20 is less than the preset predetermined threshold value. This operation can discharge the exhaust combustion exhaust gas $G_{12-1}$, in which the concentration of nitrogen oxide increases due to the reduction of the power output, as the exhaust combustion exhaust gas $G_{12-2}$. The operation can reduce the concentration of nitrogen oxide contained in the integrated combustion exhaust gas G21. Thus, this can reduce the amount of nitrogen oxide introduced in the integrated waste heat recovery boiler 12. As a result, the $CO_2$ recovery unit 13 enables $CO_2$ absorbing liquid to reduce the accumulation amount of components originated from nitrogen oxide. The control unit 18, in a case where the power output of the power generation facility 10-2 is not less than the preset predetermined threshold value, controls at least one of operations: increasing the opening amount of the flow rate control valve $V_{11\text{-}2}$ and reducing the opening amount of the flow rate control valve $V_{12\text{-}2}$. This operation can introduce the exhaust combustion exhaust gas $G_{12\text{-}2}$ with the concentration of nitrogen oxide reduced due to the increase of the power output, as the combustion exhaust gas $G_{11\text{-}2}$ to the integrated waste heat recovery boiler 12. Thus, the integrated waste heat recovery boiler 12 can increase the amount of the waste heat recovered.

The control unit 18 controls at least one of operations of reducing the opening amount of the flow rate control valve $V_{11\text{-}1}$ and increasing the opening amount of the flow rate control valve $V_{12\text{-}1}$, in a case where, as an example of the power load, the flow rate of the combustion exhaust gas $G_{11\text{-}1}$ flowing through the exhaust gas line $L_{11\text{-}1}$ measured at the flow rate measurement unit 19 is less than the preset predetermined threshold value. This operation can reduce the flow rate and discharge the combustion exhaust gas $G_{11\text{-}1}$, in which the concentration of nitrogen oxide increases due to the reduction of the power output, as the exhaust combustion exhaust gas $G_{12\text{-}1}$. The operation can reduce the concentration of nitrogen oxide contained in the integrated combustion exhaust gas G21. Thus, this can reduce the amount of nitrogen oxide introduced in the integrated waste heat recovery boiler 12. As a result, the $CO_2$ recovery unit 13 enables $CO_2$ absorbing liquid to reduce the accumulation amount of components originated from nitrogen oxide. In a case where the flow rate of the combustion exhaust gas $G_{11\text{-}1}$ flowing through the exhaust gas exhaust line $L_{12\text{-}1}$ is not less than the preset predetermined threshold value, the control unit 18 controls at least one of operations of increasing the opening amount of the flow rate control valve $V_{11\text{-}1}$ and reducing the opening amount of the flow rate control valve $V_{12\text{-}1}$. This operation can introduce the combustion exhaust gas $G_{11\text{-}1}$ that has reduced the concentration of nitrogen oxide due to the increase of the power output and has increased the flow rate due to the increase of the power output to the integrated waste heat recovery boiler 12. Thus, the integrated waste heat recovery boiler 12 can increase the amount of the waste heat recovered.

The control unit 18 controls at least one of operations of reducing the opening amount of the flow rate control valve $V_{11\text{-}2}$ and increasing the opening amount of the flow rate control valve $V_{12\text{-}2}$, in a case where, as an example of the power load, the flow rate of the combustion exhaust gas $G_{11\text{-}2}$ flowing through the exhaust gas line $L_{11\text{-}2}$ measured at the flow rate measurement unit 19 is less than the preset predetermined threshold value. This operation can reduce the flow rate and discharge the combustion exhaust gas $G_{11\text{-}2}$, in which the concentration of nitrogen oxide increases due to the reduction of the power output, as the exhaust combustion exhaust gas $G_{12\text{-}2}$. The operation can reduce the concentration of nitrogen oxide contained in the integrated combustion exhaust gas G21. Thus, this can reduce the amount of nitrogen oxide introduced in the integrated waste heat recovery boiler 12. As a result, the $CO_2$ recovery unit 13 enables $CO_2$ absorbing liquid to reduce the accumulation amount of components originated from nitrogen oxide. In a case where the flow rate of the combustion exhaust gas $G_{11\text{-}2}$ flowing through the exhaust gas exhaust line $L_{12\text{-}2}$ is not less than the preset predetermined threshold value, the control unit 18 controls at least one of operations of increasing the opening amount of the flow rate control valve $V_{11\text{-}2}$ and reducing the opening amount of the flow rate control valve $V_{12\text{-}2}$. This operation can increase an introduce amount of the combustion exhaust gas $G_{11\text{-}2}$ that has reduced the concentration of nitrogen oxide due to the increase of the power output and has increased the flow rate due to the increase of the power output to the integrated waste heat recovery boiler 12. Thus, the integrated waste heat recovery boiler 12 can increase the amount of the waste heat recovered.

The control unit 18, in a case where the power load is not greater than the predetermined threshold value, preferably controls the flow rate of the combustion exhaust gases $G_{11\text{-}1}$ and $G_{11\text{-}2}$ introduced to the integrated waste heat recovery boiler 12, based on the exhaust gas load calculated using Equation (1) below, for example. The full load flow rate mentioned here is the flow rate of the combustion exhaust gases $G_{11\text{-}1}$ and $G_{11\text{-}2}$ respectively flowing through the exhaust gas lines $L_{11\text{-}1}$ and $L_{11\text{-}2}$ in a case where the power generation facilities 10-1 and 10-2 are in a normal operation. The exhaust gas lines to be measured are the lines that supply the combustion exhaust gas to the integrated exhaust gas line $L_{21}$.

Exhaust gas load (%)=flow rate of combustion exhaust gases $G_{11\text{-}1}$ and $G_{11\text{-}2}$ flowing through exhaust gas lines $L_{11\text{-}1}$ and $L_{11\text{-}2}$ to be measured/full load flow rate of combustion exhaust gases $G_{11\text{-}1}$ and $G_{11\text{-}2}$ flowing through exhaust gas lines $L_{11\text{-}1}$ and $L_{11\text{-}2}$×100      Equation (1)

The control unit 18, in a case where the exhaust gas load calculated using above-described Equation (1) is less than the predetermined threshold value, controls at least one of operations of reducing the opening amount of the flow rate control valves $V_{11\text{-}1}$ and $V_{11\text{-}2}$, and increasing the opening amount of the flow rate control valves $V_{12\text{-}1}$ and $V_{12\text{-}2}$. This operation can discharge the combustion exhaust gases $G_{11\text{-}1}$ and $G_{11\text{-}2}$ that have increased the concentration of nitrogen oxide with reduction of the exhaust gas load as the exhaust combustion exhaust gases $G_{12\text{-}1}$ and $G_{12\text{-}2}$. Thus, the concentration of nitrogen oxide contained in the integrated combustion exhaust gas G21 can be reduced. Thus, this can reduce the amount of nitrogen oxide introduced in the integrated waste heat recovery boiler 12. As a result, the $CO_2$ recovery unit 13 enables $CO_2$ absorbing liquid to reduce the accumulation amount of components originated from nitrogen oxide. The control unit 18, in a case where the exhaust gas load calculated using above-described Equation (1) is not less than the preset predetermined threshold value, controls at least one of operations of increasing the opening amount of the flow rate control valves $V_{11\text{-}1}$ and $V_{11\text{-}2}$, and reducing the opening amount of the flow rate control valves $V_{12\text{-}1}$ and $V_{12\text{-}2}$. This operation can increase the introduce amount of the combustion exhaust gases $G_{11\text{-}1}$ and $G_{11\text{-}2}$ that have reduced the concentration of nitrogen oxide as the exhaust gas load increases, into the integrated waste heat recovery boiler 12. Thus, the integrated waste heat recovery boiler 12 can increase the amount of the waste heat recovered.

Figure 3:
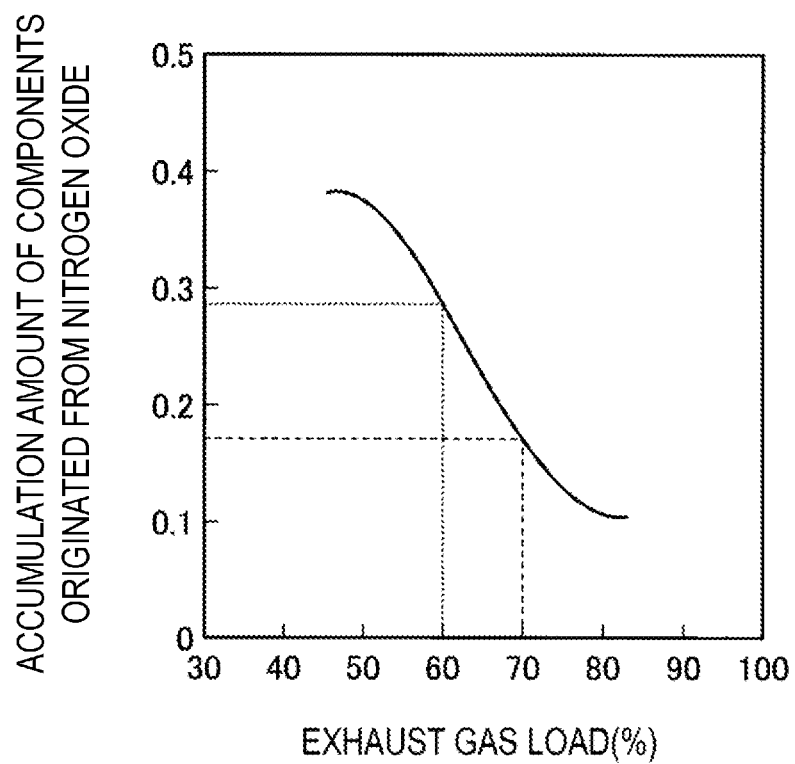
FIG. 3 is a diagram illustrating a relationship between an exhaust gas load and an accumulation amount of components originated from nitrogen oxide in the $CO_2$ absorbing liquid.

FIG. 3 is a diagram illustrating a relationship between the exhaust gas load and an accumulation amount of components originated from nitrogen oxides in the $CO_2$ absorbing liquid. As illustrated in FIG. 3, the exhaust gas treatment device 1 reduces the amount of components originated from nitrogen oxide accumulated in the $CO_2$ absorbing liquid as the exhaust gas load calculated using above-described Equation (1) increases. The accumulation amount of components originated from nitrogen oxide is approximately 0.28 times the accumulation amount of components originated from nitrogen oxide without disposing the nitrogen oxide removing unit 120 at the exhaust gas load 60%, and is approximately 0.17 times the accumulation amount of components originated from nitrogen oxide without disposing the nitrogen oxide removing unit 120 at the exhaust gas load 70%. The accumulation amount of components originated from nitrogen oxide indicates remarkable increase at the exhaust gas load in the range of less than 60%, lowering of decreasing rate of accumulation amount of components originated from nitrogen oxide at the exhaust gas load in the range of not less than 70%, and the maximum reducing rate at the exhaust gas load in the range of not less than 60% to not greater than 70%. The amount of components originated from nitrogen oxide accumulated in the $CO_2$ absorbing liquid decreases as the exhaust gas load becomes closer to 100%. Considering the above, the preset exhaust gas load threshold value is preferably not less than 60%, more preferably not less than 70%, and preferably not greater than 100%, in view of reducing the amount of component originated from nitrogen oxide accumulated in the $CO_2$ absorbing liquid to reduce the operation cost of the exhaust gas treatment device 1.

Further, the control unit 18 adjusts one of the flow rate of the combustion exhaust gases $G_{11-1}$ and $G_{11-2}$ introduced to the integrated waste heat recovery boiler 12 and the amount of the fuel supplied to the power generation facility 10 to control the temperature of the integrated combustion exhaust gas G21 measured at the first exhaust gas measurement unit 16 not lower than 300° C. and not higher than 400° C. By such control, the exhaust gas treatment device 1 can make the temperature of the integrated combustion exhaust gas G21 supplied to the nitrogen oxide removal unit 120 in the integrated waste heat recovery boiler 12 be a temperature suitable for decomposing and removing nitrogen oxide, so that nitrogen oxide in the integrated combustion exhaust gas.

The control unit 18, in a case where the temperature of the integrated combustion exhaust gas G21 measured at the first exhaust gas measurement unit 16 is lower than 300° C., controls at least one of operations of reducing the opening amount of the flow rate control valves $V_{11-1}$ and $V_{11-2}$ of the exhaust gas lines $L_{11-1}$ and $L_{11-2}$ connected to the power generation facilities 10-1 and 10-2, both of which are in the lower exhaust gas load or the lower power output; and increasing the opening amount of the flow rate control valves $V_{12-1}$ and $V_{12-2}$ of the exhaust gas exhaust lines $L_{12-1}$ and $L_{12-2}$ both of which branch off from the exhaust gas lines $L_{11-1}$ and $L_{11-2}$, to reduce the rate of the combustion exhaust gases $G_{11-1}$ and $G_{11-2}$ in the integrated combustion exhaust gas G21. This can reduce the introduce amount of the combustion exhaust gases $G_{11-1}$ and $G_{11-2}$ with the temperature reduced due to the reduction of the exhaust gas load in the integrated combustion exhaust gas G21 or the reduction of the power output, introduced to the integrated waste heat recovery boiler 12. Thus, the temperature of the integrated combustion exhaust gas G21 measured at the first exhaust gas measurement unit 16 increases. Further, the control unit 18 may increase the temperature of the integrated combustion exhaust gas G21 by an operation that maintains the opening amount of the flow rate control valves $V_{11-1}$ $V_{11-2}$, $V_{12-1}$, and $V_{12-2}$, and increases the amount of the fuel F supplied to the power generation facilities 10-1 and 10-2 both in low exhaust gas load or low power output operation.

The control unit 18, in a case where the temperature of the integrated combustion exhaust gas G21 measured at the first exhaust gas measurement unit 16 is higher than 400° C., controls at least one of operations of reducing the opening amount of the flow rate control valves $V_{11-1}$ and $V_{11-2}$ of the exhaust gas lines $L_{11-1}$ and $L_{11-2}$ connected to the power generation facilities 10-1 and 10-2, both of which are in the higher exhaust gas load or the lower power output; and increasing the opening amount of the flow rate control valves $V_{12-1}$ and $V_{12-2}$ of the exhaust gas exhaust lines $L_{12-1}$ and $L_{12-2}$ both of which branch off from the exhaust gas lines $L_{11-1}$ and $L_{11-2}$, to reduce the rate of the combustion exhaust gases $G_{11-1}$ and $G_{11-2}$ in the integrated combustion exhaust gas G21. This can reduce the introduce amount of the combustion exhaust gases $G_{11-1}$ and $G_{11-2}$ with the temperature increase due to the high exhaust gas load in the integrated combustion exhaust gas G21 or the high power output, introduced to the integrated waste heat recovery boiler 12. Thus, the temperature of the integrated combustion exhaust gas G21 measured at the first exhaust gas measurement unit 16 decreases. Further, the control unit 18 may increase the temperature of the integrated combustion exhaust gas G21 by an operation that maintains the opening amount of the flow rate control valves $V_{11-1}$ $V_{11-2}$, $V_{12-1}$, and $V_{12-2}$, and reduces the amount of the fuel F supplied to the power generation facilities 10-1 and 10-2 both in high exhaust gas load or high power output operation.

The control unit 18 adjusts the supply amount of the reducing agent supplied from the reducing agent supply unit 121, and controls the nitrogen oxide concentration in the integrated combustion exhaust gas G21 measured by the second exhaust gas measurement unit 17 to be a predetermined value or less. In case that the nitrogen oxide concentration in the integrated combustion exhaust gas G21 measured by the second exhaust gas measurement unit 17 exceeds the predetermined value, the control unit 18 increases the supply amount of the reducing agent from the reducing agent supply unit 121. In a case that the nitrogen oxide concentration in the integrated combustion exhaust gas G21 measured by the second exhaust gas measurement unit 17 is less than the predetermined value, the control unit 18 maintains or decreases the supply amount of the reducing agent from the reducing agent supply unit 121. By such control, the exhaust gas treatment device 1 can control the nitrogen oxide concentration in the integrated combustion exhaust gas G21 introduced into the $CO_2$ recovery unit 13 to be the predetermined value or less, so that it is possible to efficiently reduce the nitrogen oxide in the integrated combustion exhaust gas G21 after $CO_2$ discharged from the $CO_2$ recovery unit 13 is recovered.

Next, the overall operation of the exhaust gas treatment device 1 according to the present embodiment will be described. The combustion exhaust gas $G_{11-1}$ discharged from the power generation facility 10-1 is supplied via the exhaust gas line $L_{11-1}$ to the integrated exhaust gas line $L_{21}$. Here, in a case where the power output and the exhaust gas load of the power generation facility 10-1 and at least a part of the flow rate of the combustion exhaust gas $G_{11-1}$ flowing through the exhaust gas line $L_{11-1}$ reduces to increase the concentration of nitrogen oxide contained in the combustion exhaust gas $G_{11-1}$, at least a part of the combustion exhaust gas $G_{11-1}$ flows through the branched exhaust gas exhaust line $L_{12-1}$ as the exhaust combustion exhaust gas $G_{12-1}$. The exhaust combustion exhaust gas $G_{12-1}$ flowing through the exhaust gas exhaust line $L_{12-1}$ with the waste heat recovered at the exhaust gas waste heat recovery boiler 11, is supplied to the integrated exhaust gas exhaust line $L_{31}$. The combustion exhaust gas $G_{11-2}$ discharged from the power-generating facility 10-2 is supplied via the exhaust gas line $L_{11-2}$ to the integrated exhaust gas line $L_{21}$. Here, in a case where the power output and the exhaust gas load of the power generation facility 10-2 and at least a part of the flow rate of the combustion exhaust gas $G_{11-2}$ flowing through the exhaust gas line $L_{11-2}$ reduces to increase the concentration of nitrogen oxide contained in the combustion exhaust gas $G_{11-2}$, at least a part of the combustion exhaust gas $G_{11-2}$ flows through the branched exhaust gas exhaust line $L_{12-2}$ as the exhaust combustion exhaust gas $G_{12-2}$. The exhaust combustion exhaust gas $G_{12-2}$ flowing through the exhaust gas exhaust line $L_{12-2}$ is supplied to the integrated exhaust gas exhaust line $L_{31}$. The exhaust combustion exhaust gases $G_{12-1}$ and $G_{12-2}$ supplied to the integrated exhaust gas exhaust line $L_{31}$ are integrated into the integrated exhaust combustion exhaust gas G31 then discharged through the stack 15.

The combustion exhaust gases $G_{11-1}$ and $G_{11-2}$ supplied to the integrated exhaust gas line $L_{21}$ are integrated into the integrated combustion exhaust gas G21, then supplied to the integrated waste heat recovery boiler 12. Here, the control unit 18 controls the valve opening amounts of the flow rate control valve $V_{11-1}$ and the flow rate control valve $V_{11-2}$ and the supply amount of the fuel supplied to the power-generating facility 10 as needed, such that the temperature of the integrated combustion exhaust gas G21 is a predetermined temperature (for example, 300° C. or higher and 400° C. or lower). The integrated combustion exhaust gas G21 supplied to the integrated waste heat recovery boiler 12 is supplied with the reducing agent by the reducing agent supply unit 121 in the nitrogen oxide removal unit 120, and, after nitrogen oxide is decomposed and removed by selective catalytic reduction unit 122, is supplied to the $CO_2$ recovery unit 13. Here, the control unit 18 controls an amount of the reducing agent supplied from the reducing agent supply unit 121 to the integrated combustion exhaust gas G21 as needed, such that nitrogen oxide in the integrated combustion exhaust gas G21 supplied to the $CO_2$ recovery unit 13 is a predetermined value or less. The integrated combustion exhaust gas G21 supplied to the $CO_2$ recovery unit 13, after $CO_2$ is recovered by the $CO_2$ absorbing liquid, is discharged out of the exhaust gas treatment device 1. $CO_2$ in the integrated combustion exhaust gas G21 recovered by the $CO_2$ absorbing liquid is heated to be released from the $CO_2$ absorbing liquid, and thereafter, supplied to the $CO_2$ compression unit 14, and compressed and discharged.

As described above, according to the above-described embodiment, in a case where nitrogen oxide contained in the combustion exhaust gases $G_{11-1}$ and $G_{11-2}$ discharged from at least one of the power generation facilities 10-1 and 10-2 increase, at least one of the combustion exhaust gases $G_{11-1}$ and $G_{11-2}$ with the increased concentration of nitrogen oxide, can be discharged outside through at least one of the exhaust gas exhaust lines $L_{12-1}$ and $L_{12-2}$. This enables the exhaust gas treatment device 1 to adjust the concentration of nitrogen oxide, contained in the integrated combustion exhaust gas G21, introduced to the nitrogen oxide removing unit 120 to the range suitable for the nitrogen oxide decomposition treatment. Thus, nitrogen oxide contained the integrated combustion exhaust gas G21 can be efficiently decomposed and removed. Consequently, this operation enables the exhaust gas treatment device 1 to reduce the amount of components originated from nitrogen oxide accumulated to the $CO_2$ absorbing liquid, and reduce the operation cost.

Figure 4:
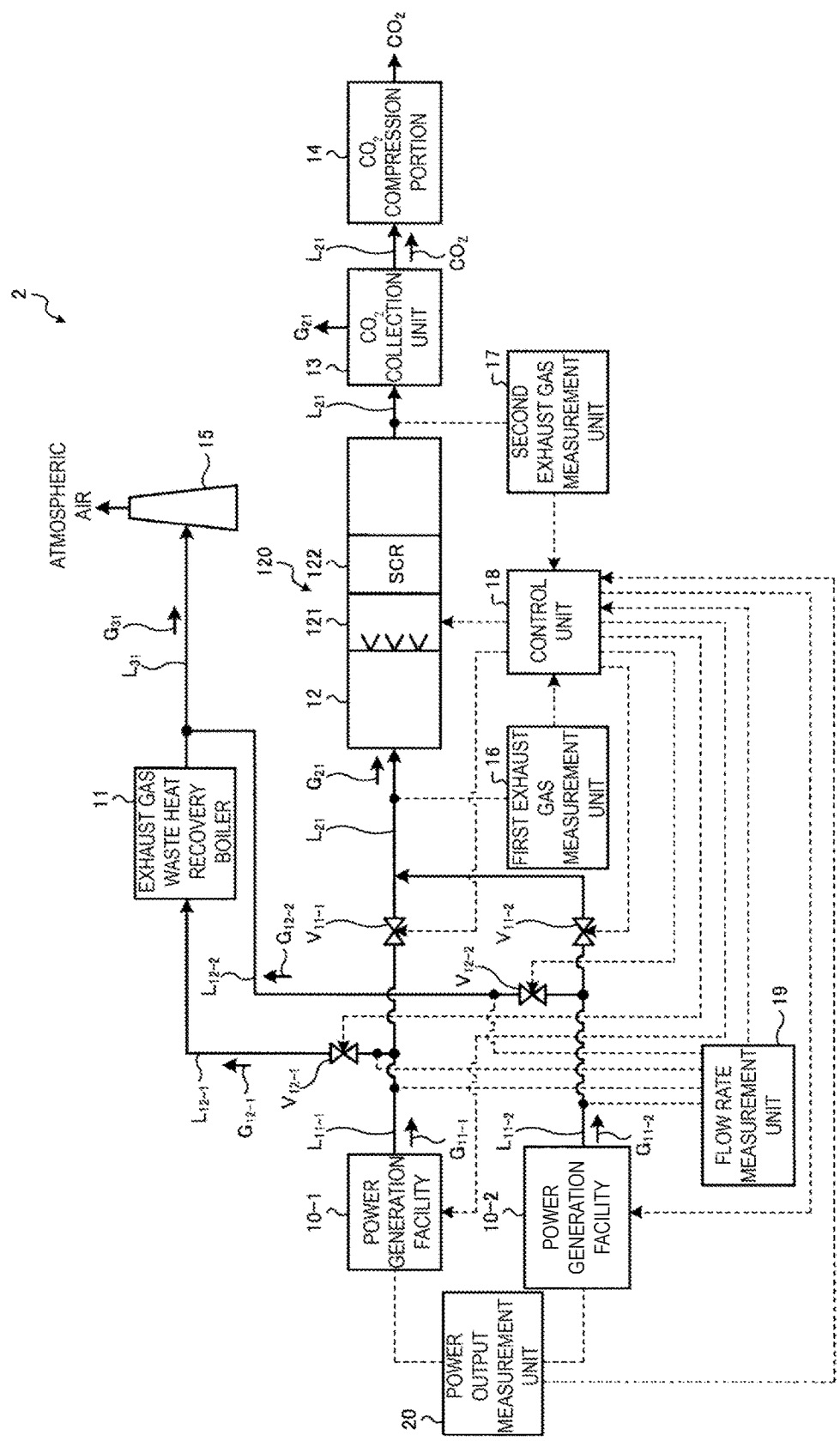
FIG. 4 is a schematic diagram illustrating another example of the exhaust gas treatment device according to the embodiment of the present invention.

Note that, in the above-described embodiment, a configuration is described in which the exhaust gas waste heat recovery boiler 11 is disposed at the integrated exhaust gas exhaust line $L_{31}$. However, the exhaust gas waste heat recovery boiler 11 may be disposed at the exhaust gas exhaust line $L_{12-1}$ as an exhaust gas treatment device 2 illustrated in FIG. 4, may be disposed at the exhaust gas exhaust line $L_{12-2}$, and may be disposed at both of the exhaust gas exhaust lines $L_{12-1}$ and $L_{12-2}$. Disposing the exhaust gas waste heat recovery boiler 11 is not always necessary.

Note that, an example is described in the above-described embodiment in which each of the exhaust gas lines $L_{11-1}$ and $L_{11-2}$ includes the exhaust gas exhaust lines $L_{12-1}$ and $L_{12-2}$ respectively; however, at least one of the exhaust gas exhaust lines $L_{12-1}$ and $L_{12-2}$ may be disposed. In this case, configuration may be changed according to the capacity of the power generation facilities 10-1 and 10-2. For example, the exhaust gas exhaust line $L_{12-1}$ may be disposed at the exhaust gas line $L_{11-1}$ of the power generation facility 10-1 in the operation condition that tend to reduce the power output, on the other hand, the exhaust gas exhaust line $L_{12-2}$ may not be disposed at the exhaust gas line $L_{11-2}$ of the power generation facility 10-2 in the operation condition that does not tend to reduce the power output. This configuration can reduce nitrogen oxide contained in the integrated combustion exhaust gas G21 even in a case where the concentration of nitrogen oxide contained in the combustion exhaust gas $G_{11-1}$ increases due to the power output reduction solely of the power generation facility 10-1. The power generation facilities 10-1 and 10-2 may be existing power generation facilities and may be newly established power generation facilities. In a case where the power generation facilities 10-1 and 10-2 are existing power generation facilities, disposing exhaust gas exhaust lines to the existing exhaust gas lines may be sufficient.

Figure 5:
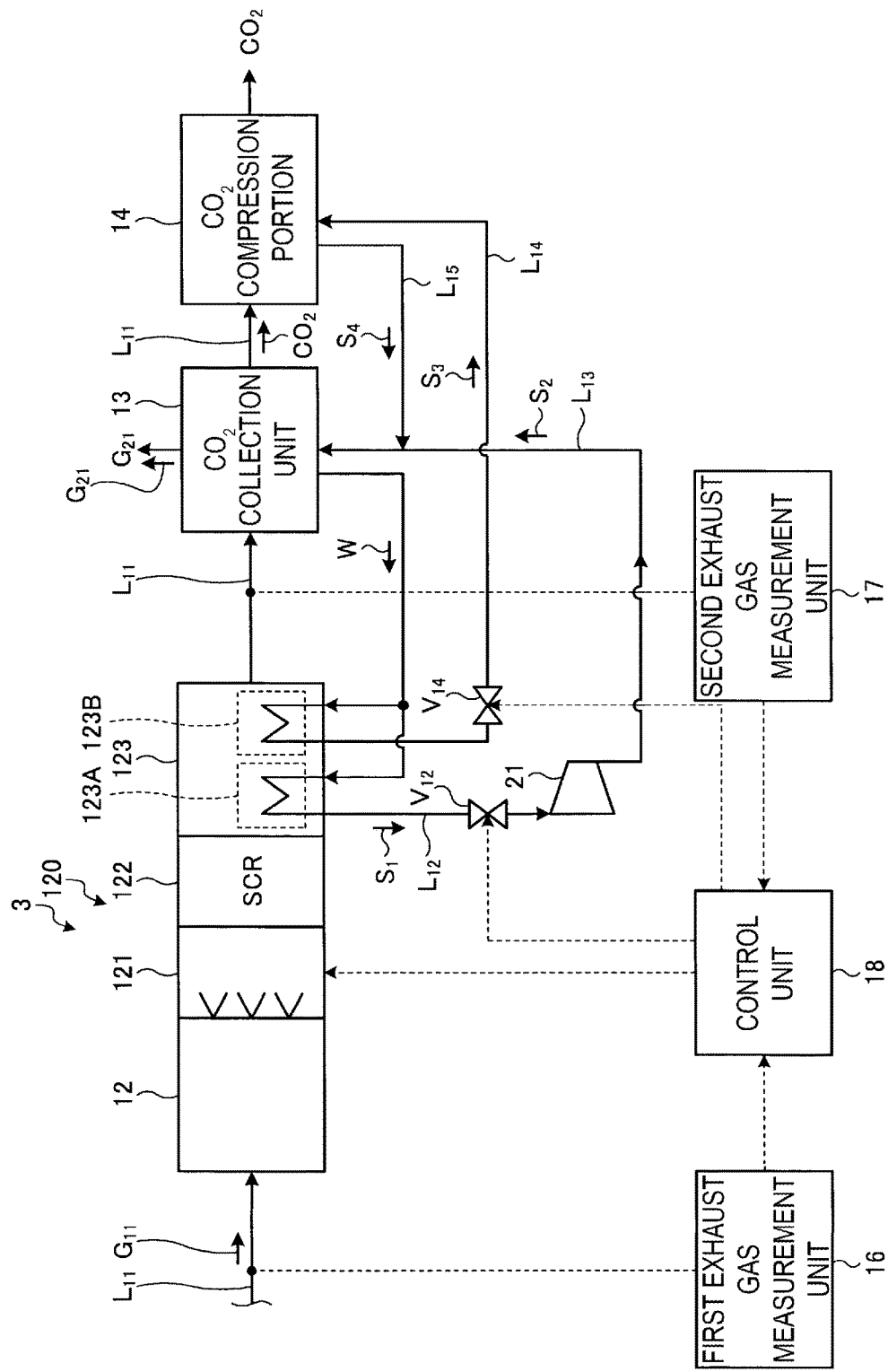
FIG. 5 is a schematic diagram illustrating another example of the exhaust gas treatment device according to the embodiment of the present invention.

The configuration of the integrated waste heat recovery boiler 12 in the embodiment described above can be adequately modified. FIG. 5 is a schematic diagram illustrating another example of the exhaust gas treatment device 1 according to the above-described embodiment. In an exhaust gas treatment device 3 illustrated in FIG. 5, the integrated waste heat recovery boiler 12 includes a steam generation unit 123 provided on a downstream stage of the nitrogen oxide removal unit 120. The steam generation unit 123 includes a turbine-driving steam generation unit 123A provided on a downstream stage of the nitrogen oxide removal unit 120 in the flow direction of the integrated combustion exhaust gas G21, and a $CO_2$ compression portion-driving steam generation unit 123B provided on a downstream stage of the turbine-driving steam generation unit 123A.

The turbine-driving steam generation unit 123A recovers the waste heat of the integrated combustion exhaust gas G21 from which nitrogen oxide has been removed to generate a turbine-driving steam $S_1$ that is a low-pressure steam for driving the low-pressure steam turbine 21. The turbine-driving steam generation unit 123A supplies the generated turbine-driving steam $S_1$ to the low-pressure steam turbine 21 via a steam supply line $L_{12}$. The low-pressure steam turbine 21 may be a turbine provided outside the exhaust gas treatment device 3, or the low-pressure steam turbine 221 in the power generation facility 10 illustrated in FIG. 2. The low-pressure steam turbine 21 is rotationally driven by the turbine-driving steam $S_1$ to generate power by a generator (not illustrated in the drawing). This allows the exhaust gas treatment device 3 to generate power by using the waste heat of the integrated combustion exhaust gas G21 recovered by the integrated waste heat recovery boiler 12, and therefore, the steam required for driving the low-pressure steam turbine 21 can be reduced. The low-pressure steam turbine 21 supplies the turbine-driving steam $S_1$ after driving the turbine as a $CO_2$ absorbing liquid-regenerating steam $S_2$ to the $CO_2$ recovery unit 13 via a steam discharge line $L_{13}$.

The $CO_2$ compression portion-driving steam generation unit 123B recovers the waste heat of the integrated combustion exhaust gas G21 from which nitrogen oxide has been removed to generate a $CO_2$ compression portion-driving steam $S_3$ that is a low-pressure steam for driving the $CO_2$ compression portion 14. The $CO_2$ compression portion-driving steam generation unit 123B supplies the generated $CO_2$ compression portion-driving steam $S_3$ to the $CO_2$ compression portion 14 via a steam supply line $L_{14}$. The $CO_2$ compression portion 14 drives the $CO_2$ compressor by using the $CO_2$ compression portion-driving steam $S_3$ to compress $CO_2$. This allows the exhaust gas treatment device 3 to compress $CO_2$ by using the waste heat of the integrated combustion exhaust gas G21 recovered by the integrated waste heat recovery boiler 12, and therefore, the steam required for compressing $CO_2$ can be reduced. The $CO_2$ compression portion 14 supplies the $CO_2$ compression portion-driving steam $S_3$ after driving the $CO_2$ compressor as a $CO_2$ absorbing liquid-regenerating steam $S_4$ to the $CO_2$ recovery unit 13 via a steam discharge line Lis.

The $CO_2$ recovery unit 13 supplies the $CO_2$ absorbing liquid-regenerating steams $S_2$ and $S_4$ to a reboiler in the $CO_2$ regeneration tower to release $CO_2$ from the $CO_2$ absorbing liquid having recovered $CO_2$. This allows the exhaust gas treatment device 3 to reduce the steam used for the reboiler in the $CO_2$ absorbing tower. The $CO_2$ recovery unit 13 supplies a condensed water W in which condensed is the $CO_2$ absorbing liquid-regenerating steams $S_2$ and $S_4$ having been used for the reboiler in the $CO_2$ absorbing tower to the turbine-driving steam generation unit 123A and the $CO_2$ compression portion-driving steam generation unit 123B in the integrated waste heat recovery boiler 12.

The control unit 18 controls a supply amount of the fuel supplied to the combustor in the power generation facility 10, a supply amount of the turbine-driving steam $S_1$ supplied to the low-pressure steam turbine 21, and a supply amount of the $CO_2$ compression portion-driving steam $S_3$ supplied to the $CO_2$ compression portion 14, based on the temperature and gas flow rate of the integrated combustion exhaust gas G21, measured by the first exhaust gas measurement unit 16 and introduced into the nitrogen oxide removal unit 120. In a case where the temperature and gas flow rate of the integrated combustion exhaust gas G21 introduced into the nitrogen oxide removal unit 120 is less than a predetermined range, the control unit 18 increases the fuel F supplied to the combustor 212 in the power generation facility 10. In a case where the temperature and gas flow rate of the integrated combustion exhaust gas G21 introduced into the nitrogen oxide removal unit 120 exceeds the predetermined range, the control unit 18 decreases the fuel F supplied to the combustor 212 in the power generation facility. In a case where the temperature and gas flow rate of the integrated combustion exhaust gas G21 introduced into the nitrogen oxide removal unit 120 is less than the predetermined range, the control unit 18 decreases an opening amount of at least one of a flow rate control valve $V_{12}$ provided to the steam supply line $L_{12}$ and a flow rate control valve $V_{14}$ provided to the steam supply line $L_{14}$ to decrease the supply amount of at least one of the turbine-driving steam $S_1$ supplied to the low-pressure steam turbine 21 and the $CO_2$ compression portion-driving steam $S_3$ supplied to the $CO_2$ compression portion 14. In a case where the temperature and gas flow rate of the integrated combustion exhaust gas G21 introduced into the nitrogen oxide removal unit 120 exceeds the predetermined range, the control unit 18 increases the opening amount of at least one of the flow rate control valve $V_{12}$ provided to the steam supply line $L_{12}$ and the flow rate control valve $V_{14}$ provided to the steam supply line $L_{14}$ to increase the supply amount of at least one of the turbine-driving steam $S_1$ supplied to the low-pressure steam turbine 21 and the $CO_2$ compression portion-driving steam $S_3$ supplied to the $CO_2$ compression portion 14. By such control, the temperature of the integrated combustion exhaust gas G21 introduced into the nitrogen oxide removal unit 120 can be controlled to be in a range suitable for decomposing and removing nitrogen oxide, so that nitrogen oxide in the integrated combustion exhaust gas can be efficiently reduced.

As described above, according to the exhaust gas treatment device 3 in the above-described embodiment, by virtue of the turbine-driving steam generation unit 123A and the $CO_2$ compression portion-driving steam generation unit 123B in the integrated waste heat recovery boiler 12, the turbine-driving steam $S_1$ required for rotationally driving the low-pressure steam turbine 21, the $CO_2$ compression portion-driving steam $S_3$ required for compressing $CO_2$, and the $CO_2$ absorbing liquid-regenerating steams $S_2$ and $S_4$ required for regenerating the $CO_2$ absorbing liquid can be acquired, so that an amount of the steam used in the whole exhaust gas treatment device 3 can be reduced.

Figure 6:
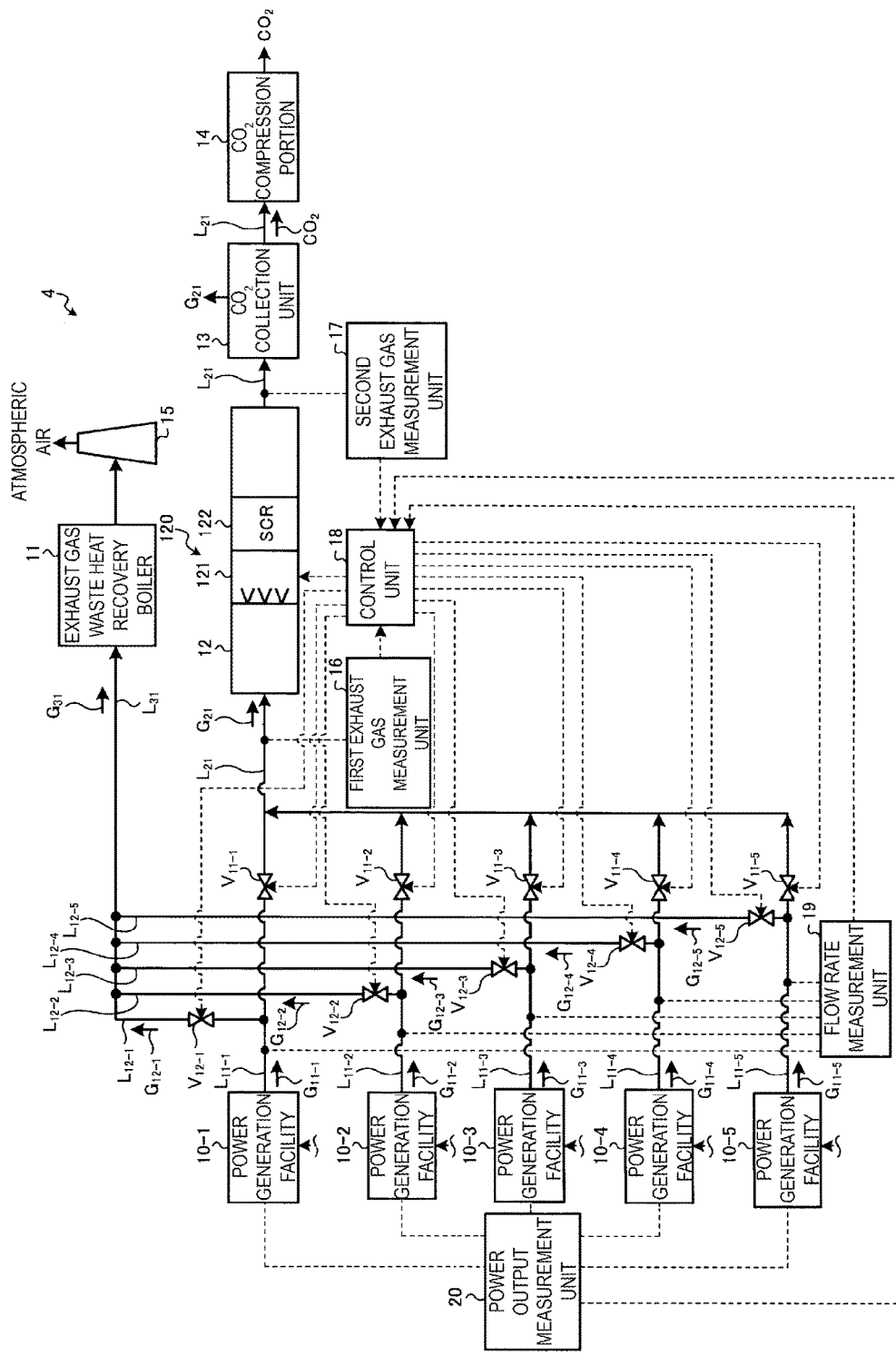
FIG. 6 is a schematic diagram illustrating another example of the exhaust gas treatment device according to the embodiment of the present invention.

The exhaust gas treatment device 1 illustrated in FIG. 1 is described by using an example in which the exhaust gas treatment device 1 treats two combustion exhaust gases, the combustion exhaust gases $G_{11-1}$ and $G_{11-2}$ from the power generation facilities 10-1 and 10-2. However, the second power generation facility and second exhaust gas flow path may be plural, and the exhaust gas treatment device 1 can treat greater number of combustion exhaust gases from the power generation facilities. FIG. 6 is a schematic diagram illustrating another example of the exhaust gas treatment device 1 according to the present embodiment. As illustrated in FIG. 6, an exhaust gas treatment device 4 recovers, by the integrated waste heat recovery boiler 12, waste heat of combustion exhaust gases $G_{11-1}$, $G_{11-2}$, $G_{11-3}$, $G_{11-4}$, and $G_{11-5}$ discharged from five power generation facilities 10-1, 10-2, 10-3, 10-4, and 10-5. Then, the exhaust gas treatment device 4 recovers $CO_2$ contained in the combustion exhaust gases $G_{11-1}$, $G_{11-2}$, $G_{11-3}$, $G_{11-4}$, and $G_{11-5}$ by using the $CO_2$ recovery unit 13. The exhaust gas treatment device 4 includes the power generation facility 10-1 discharging the combustion exhaust gas $G_{11-1}$G, the power generation facility 10-2 discharging the combustion exhaust gas $G_{11-2}$, the power generation facility 10-3 discharging the combustion exhaust gas $G_{11-3}$, the power generation facility 10-4 discharging the combustion exhaust gas $G_{11-4}$, and the power generation facility 10-5 discharging the combustion exhaust gas $G_{11-5}$, the integrated waste heat recovery boiler 12 disposed at the downstream stage of the power generation facilities 10-1, 10-2, 10-3, 10-4, and 10-5, the $CO_2$ recovery unit 13 disposed at the downstream stage of the integrated waste heat recovery boiler 12, and the $CO_2$ compression portion 14 disposed at the downstream stage of the $CO_2$ recovery unit 13.

The power generation facilities 10-3, 10-4, and 10-5 discharge the combustion exhaust gas $G_{11-3}$ produced by power generation to the exhaust gas lines $L_{11-3}$, $L_{11-4}$, and $L_{11-5}$, respectively. The exhaust gas lines $L_{11-3}$, $L_{11-4}$, and $L_{11-5}$ respectively supply the combustion exhaust gases $G_{11-3}$, $G_{11-4}$, and $G_{11-5}$ discharged from the power generation facilities 10-3, 10-4, and 10-5 to the integrated waste heat recovery boiler 12. The exhaust gas lines $L_{11-3}$, $L_{11-4}$, and $L_{11-5}$ respectively include flow rate control valves $V_{11-3}$, $V_{11-4}$, and $V_{11-5}$ that respectively adjust the flow rate of the combustion exhaust gases $G_{11-3}$, $G_{11-4}$, and $G_{11-5}$ respectively flowing through the exhaust gas lines $L_{11-3}$, $L_{11-4}$, and $L_{11-5}$. Further, the exhaust gas lines $L_{11-3}$, $L_{11-4}$, and $L_{11-5}$ respectively include branched exhaust gas exhaust lines $L_{12-3}$, $L_{12-4}$, and $L_{12-5}$ that are respectively disposed between the power generation facilities 10-3, 10-4, and 10-5 and the integrated waste heat recovery boiler 12, and are respectively disposed at the downstream stage of the flow rate control valves $V_{11-3}$, $V_{11-4}$, and $V_{11-5}$. These exhaust gas exhaust lines $L_{12-3}$, $L_{12-4}$, and $L_{12-5}$ respectively include the flow rate control valves $V_{12-3}$, $V_{12-4}$, and $V_{12-5}$, and the exhaust gas waste heat recovery boiler 11 and the stack 15 in this order. The flow rate control valves $V_{12-3}$, $V_{12-4}$, and $V_{12-5}$ respectively adjust the flow rate of the exhaust combustion exhaust gases $G_{12-3}$, $G_{12-4}$, and $G_{12-5}$ respectively flowing through the exhaust gas exhaust lines $L_{12-3}$, $L_{12-4}$, and $L_{12-5}$. The exhaust gas waste heat recovery boiler 11 recovers the waste heat from each of the exhaust combustion exhaust gases $G_{12-3}$, $G_{12-4}$, and $G_{12-5}$ respectively flowing through the exhaust gas exhaust lines $L_{12-3}$, $L_{12-4}$, and $L_{12-5}$, and supplies each of the exhaust combustion exhaust gases $G_{12-3}$, $G_{12-4}$, and $G_{12-5}$ with the waste heat recovered, to the stack 15. The stack 15 discharges the exhaust combustion exhaust gases $G_{12-3}$, $G_{12-4}$, and $G_{12-5}$ with the waste heat recovered, to outside. Disposing the exhaust gas waste heat recovery boiler 11 is not always necessary.

The integrated waste heat recovery boiler 12 is supplied with the integrated combustion exhaust gas G21 in which the combustion exhaust gases $G_{11-1}$, $G_{11-2}$, $G_{11-3}$, $G_{11-4}$, and $G_{11-5}$ flowing through the exhaust gas lines $L_{11-1}$, $L_{11-2}$, $L_{11-3}$, $L_{11-4}$, and Lips are integrated. The integrated waste heat recovery boiler 12 recovers the waste heat of the integrated combustion exhaust gas G21.

Further, the exhaust gas treatment device 4 includes the control unit 18 that controls the flow rate of the combustion exhaust gases $G_{11-1}$, $G_{11-2}$, $G_{11-3}$, $G_{11-4}$, and $G_{11-5}$ introduced in the integrated waste heat recovery boiler 12, the amount of the fuel F supplied to the power generation facilities 10-1, 10-2, 10-3, 10-4, and 10-5, and the amount of the reducing agent supplied to the integrated combustion exhaust gas G21 from the reducing agent supplying unit 121; the flow rate measurement unit 19 that measures the flow rate of the combustion exhaust gases $G_{11-1}$, $G_{11-2}$, $G_{11-3}$, $G_{11-4}$, and $G_{11-5}$ flowing through the exhaust gas lines $L_{11-1}$, $L_{11-2}$, $L_{11-3}$, $L_{11-4}$, and $L_{11-5}$, and the flow rate of the exhaust combustion exhaust gases $G_{12-1}$, $G_{12-2}$, $G_{12-3}$, $G_{12-4}$, and $G_{12-5}$ flowing through the exhaust gas exhaust lines $L_{12-1}$, $L_{12-2}$, $L_{12-3}$, $L_{12-4}$, and $L_{12-5}$; and the output measurement unit 20 that measures the power output of the power generation facilities 10-1, 10-2, 10-3, 10-4, and 10-5. Measurements are performed by a known method, the measurements including: a gas flow rate and temperature measurement by the first exhaust gas measurement unit 16, a gas flow rate and concentration of nitrogen oxide measurement by the second exhaust gas measurement unit 17, a measurement of flow rate of the combustion exhaust gases $G_{11-1}$, $G_{11-2}$, $G_{11-3}$, $G_{11-4}$, and $G_{11-5}$, and the exhaust combustion exhaust gases $G_{12-1}$, $G_{12-2}$, $G_{12-3}$, $G_{12-4}$, and $G_{12-5}$ at flow rate measurement unit 19, and a measurement of the power output of the power generation facilities 10-1, 10-2, 10-3, 10-4, and 10-5 measured at the output measurement unit 20.

The control unit 18, based on the gas flow rate and temperature of the integrated combustion exhaust gas G21 measured at the first exhaust gas measurement unit 16, adjusts the opening amount of the flow rate control valves $V_{11-1}$, $V_{11-2}$, $V_{11-3}$, $V_{11-4}$, $V_{11-5}$, $V_{12-1}$, $V_{12-2}$, $V_{12-3}$, $V_{12-4}$, and $V_{12-5}$ and the amount of fuel supplied to the power generation facilities 10-1, 10-2, 10-3, 10-4, and 10-5. Further, the control unit 18 controls the flow rate of the combustion exhaust gases $G_{11-1}$, $G_{11-2}$, $G_{11-3}$, $G_{11-4}$, and $G_{11-5}$ introduced to the integrated waste heat recovery boiler 12, based on at least one of the flow rate of the combustion exhaust gases $G_{11-1}$, $G_{11-2}$, $G_{11-3}$, $G_{11-4}$, and $G_{11-5}$ flowing through the exhaust gas lines $L_{11-1}$, $L_{11-2}$, $L_{11-3}$, $L_{11-4}$, and $L_{11-5}$ and the exhaust gas exhaust lines $L_{12-1}$, $L_{12-2}$, $L_{12-3}$, $L_{12-4}$, and $L_{12-5}$ and the power output of the power generation facilities 10-1, 10-2, 10-3, 10-4, and 10-5. The control unit 18, based on the gas flow rate and the concentration of nitrogen oxide of the integrated combustion exhaust gas G21 measured at the second exhaust gas measurement unit 17, controls the amount of the fuel F supplied to the power generation facilities 10-1, 10-2, 10-3, 10-4, and 10-5. Specific control for each unit by the control unit 18 and other configurations are the same as the exhaust gas treatment device 1 illustrated in FIG. 1 and the description therefor are omitted.

Next, the overall operation of the exhaust gas treatment device 4 according to the present embodiment will be described. The combustion exhaust gases $G_{11-1}$, $G_{11-2}$, $G_{11-3}$, $G_{11-4}$, and $G_{11-5}$ discharged from the power generation facilities 10-1, 10-2, 10-3, 10-4, and 10-5 are supplied to the integrated exhaust gas line $L_{21}$ through the exhaust gas lines $L_{11-1}$, $L_{11-2}$, $L_{11-3}$, $L_{11-4}$, and $L_{11-5}$. In a case where at least a part of the power load of the power generation facilities 10-1, 10-2, 10-3, 10-4, and 10-5 reduces to increases the concentration of nitrogen oxide contained in the combustion exhaust gas $G_{11-1}$, at least a part of the combustion exhaust gases $G_{11-1}$, $G_{11-2}$, $G_{11-3}$, $G_{11-4}$, and $G_{11-5}$ flows through the branched lines, the exhaust gas exhaust lines $L_{12-1}$, $L_{12-2}$, $L_{12-3}$, $L_{12-4}$, and $L_{12-5}$. The combustion exhaust gases $G_{11-1}$, $G_{11-2}$, $G_{11-3}$, $G_{11-4}$, and $G_{11-5}$ flowing through the exhaust gas exhaust lines $L_{12-1}$, $L_{12-2}$, $L_{12-3}$, $L_{12-4}$, and $L_{12-5}$ with the waste heat recovered at the exhaust gas waste heat recovery boiler 11, are supplied to the integrated exhaust gas exhaust line $L_{31}$. The combustion exhaust gases $G_{11-1}$, $G_{11-2}$, $G_{11-3}$, $G_{11-4}$, and $G_{11-5}$ supplied to the integrated exhaust gas exhaust line $L_{31}$ are integrated into the integrated combustion exhaust gas $G_{21}$, then is discharged from the stack 15.

The combustion exhaust gases $G_{11-1}$, $G_{11-2}$, $G_{11-3}$, $G_{11-4}$, and $G_{11-5}$ supplied to the integrated exhaust gas line $L_{21}$ are integrated into the integrated combustion exhaust gas G21 to be supplied to the integrated waste heat recovery boiler 12. Here, the control unit 18 controls, as necessary, the valve opening amount of the flow rate control valves $V_{11-1}$, $V_{11-2}$, $V_{11-3}$, $V_{11-4}$, and $V_{11-s}$ and the amount of the fuel F supplied to the power generation facilities 10-1, 10-2, 10-3, 10-4, and 10-5, to control the temperature of the integrated combustion exhaust gas G21 in the predetermined temperatures (for example, not lower than 300° C. and not higher than 400° C.). The integrated combustion exhaust gas G21 supplied to the integrated waste heat recovery boiler 12 is supplied with the reducing agent by the reducing agent supply unit 121 in the nitrogen oxide removal unit 120, and, after nitrogen oxide is decomposed and removed by selective catalytic reduction unit 122, is supplied to the $CO_2$ recovery unit 13. Here, the control unit 18 controls an amount of the reducing agent supplied from the reducing agent supply unit 121 to the integrated combustion exhaust gas G21, such that nitrogen oxide in the integrated combustion exhaust gas G21 supplied to the $CO_2$ recovery unit 13 is a predetermined value or less. The integrated combustion exhaust gas G21 supplied to the $CO_2$ recovery unit 13, after $CO_2$ is recovered by the $CO_2$ absorbing liquid, is discharged out of the exhaust gas treatment device 4. $CO_2$ in the integrated combustion exhaust gas G21 recovered by the $CO_2$ absorbing liquid is heated to be released from the $CO_2$ absorbing liquid, and thereafter, supplied to the $CO_2$ compression unit 14, and compressed and discharged.

As described above, according to the above-described embodiment, in a case where nitrogen oxide contained in at least one of the combustion exhaust gases $G_{11-1}$, $G_{11-2}$, $G_{11-3}$, $G_{11-4}$, and $G_{11-5}$ discharged from at least one of the power generation facilities 10-1, 10-2, 10-3, 10-4, and 10-5 increase, the exhaust gas treatment device 4 can discharge at least one of the combustion exhaust gases $G_{11-1}$, $G_{11-2}$, $G_{11-3}$, $G_{11-4}$, and $G_{11-5}$ with the concentration of nitrogen oxide increased outside as the exhaust combustion exhaust gases $G_{12-1}$, $G_{12-2}$, $G_{12-3}$, $G_{12-4}$, and $G_{12-5}$ at least through one of the exhaust gas exhaust lines $L_{12-1}$, $L_{12-2}$, $L_{12-3}$, $L_{12-4}$, and $L_{12-5}$. This enables the exhaust gas treatment device 4 to adjust the concentration of nitrogen oxide, contained in the integrated combustion exhaust gas G21, introduced to the nitrogen oxide removing unit 120 to the range suitable for the nitrogen oxide decomposition treatment. Thus, nitrogen oxide contained the integrated combustion exhaust gas G21 can be efficiently decomposed and removed. Consequently, this operation enables the exhaust gas treatment device 4 to reduce the amount of components originated from nitrogen oxide accumulated to the $CO_2$ absorbing liquid, and reduce the operation cost. In addition, for example, in a case where two power generation facilities 10-1 and 10-2 already exist, the configuration of the exhaust gas treatment device 4 can be completed only by newly establishing the power generation facilities 10-3, 10-4, and 10-5. In the above, in a case where the existing two power generation facilities 10-1 and 10-2 reduce the power load and the exhaust gas load easier than newly establishing three power generation facilities 10-3, 10-4, and 10-5, the exhaust gas exhaust lines $L_{12-3}$, $L_{12-4}$, and $L_{12-5}$ are not necessarily disposed, and only the exhaust gas exhaust lines $L_{12-1}$ and $L_{12-2}$ are disposed. Even in the above configuration, the exhaust gas treatment device 4 still can adjust the concentration of nitrogen oxide in the integrated combustion exhaust gas G21 in the concentration range suitable for the nitrogen oxide decomposition treatment. As described above, the exhaust gas treatment device 4 places the exhaust gas exhaust lines $L_{12-1}$, $L_{12-2}$, $L_{12-3}$, $L_{12-4}$, and $L_{12-5}$ to the facilities easily reducing the power load and exhaust gas load among the a plurality of power generation facilities 10-1, 10-2, 10-3, 10-4, and 10-5, and switch the flow rate of the exhaust combustion exhaust gases $G_{12-1}$ $G_{12-2}$, $G_{12-3}$, $G_{12-4}$, and $G_{12-5}$ during the operation. Thus, the exhaust gas treatment device 4 can reduce the amount of components originated from nitrogen oxide accumulated in the $CO_2$ absorbing liquid, and can reduce the operation cost.

Example

The inventors investigated in detail effects to reduce the amount of components originated from nitrogen oxide ($NO_2$) accumulated in the $CO_2$ absorbing liquid in the exhaust gas treatment device according to the above-described embodiments. The contents investigated by the inventors will be described below.

Figure 7:
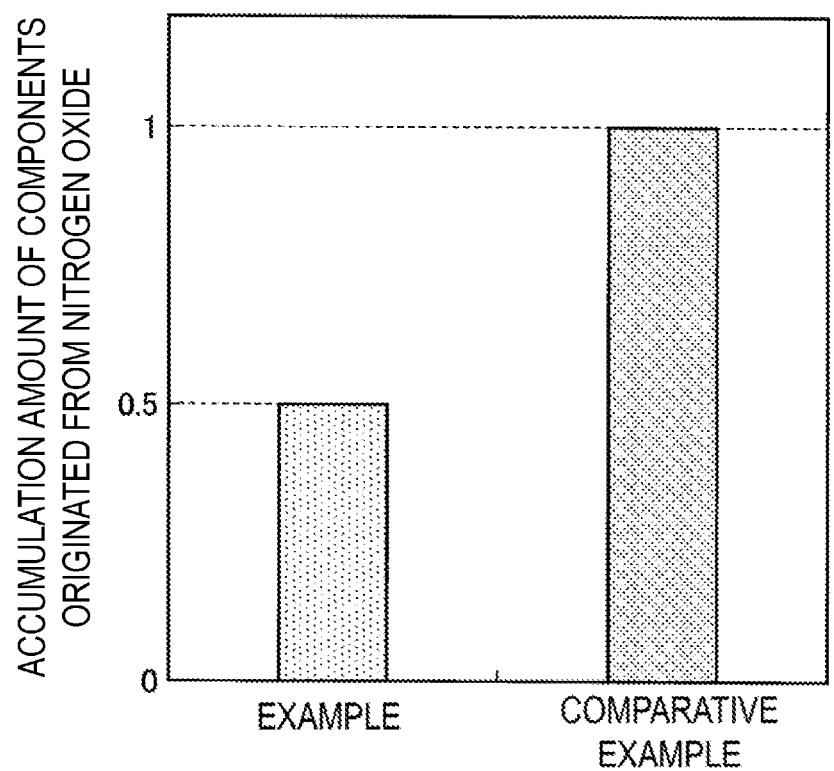
FIG. 7 is a graph illustrating an accumulation amount of components originated from nitrogen oxide in the $CO_2$ absorbing liquid of the exhaust gas treatment device according to each of an example and a comparative example.

FIG. 7 is an explanatory graph illustrating an accumulation amount of components originated from nitrogen oxides in the $CO_2$ absorbing liquid of the exhaust gas treatment device according to each of the working example and the comparative example. FIG. 7 illustrates the accumulation amount of components originated from nitrogen oxide in a case of disposing the exhaust gas lines $L_{11-1}$ and $L_{11-2}$ (see Example) in comparison with the accumulation amount of components originated from nitrogen oxide in a case of not disposing the exhaust gas lines $L_{11-1}$ and $L_{11-2}$ (see Comparative Example) in the exhaust gas treatment device 1 according to the embodiment. As illustrated in FIG. 7, the exhaust gas treatment device can reduce, by disposing the exhaust gas lines $L_{11-1}$ and $L_{11-2}$, the amount of component originated from nitrogen oxide accumulated in the $CO_2$ absorbing liquid to approximately 0.5 times the amount without the exhaust gas lines $L_{11-1}$ and $L_{11-2}$. From this result, according to the exhaust gas treatment device of the above-described embodiments, it can be seen that the nitrogen oxide accumulated in the $CO_2$ absorbing liquid can be extremely reduced, and an operation cost of the exhaust gas treatment device can be reduced.

REFERENCE SIGNS LIST 1, 2, 3, 4 Exhaust gas treatment device
10, 10-1, 10-2, 10-3, 10-4, 10-5 Power generation facility
11 Exhaust gas waste heat recovery boiler
12 Integrated waste heat recovery boiler
13 $CO_2$ recovery unit
14 $CO_2$ compression portion
15 Stack
16 First exhaust gas measurement unit
17 Second exhaust gas measurement unit
18 Control unit
19 Flow rate measurement unit
20 Output measurement unit
21 Low-pressure steam turbine
210 Gas turbine
211 Compressor
212 Combustor
213 Turbine
221 Low-pressure steam turbine
222 High-pressure steam turbine
222A Mid-pressure steam turbine
222B High-pressure steam turbine
230 Generator
240 Turbine shaft
A Air
F Fuel
$G_{11-1}$, $G_{11-2}$, $G_{11-3}$, $G_{11-4}$, $G_{11-5}$ Combustion exhaust gas
$G_{12-1}$, $G_{12-2}$, $G_{12-3}$, $G_{12-4}$, $G_{12-5}$ Exhaust gas combustion exhaust gas
$G_{21}$ Integrated combustion exhaust gas
$G_{31}$ integrated exhaust combustion exhaust gas
$L_{11-1}$, $L_{11-2}$, $L_{11-3}$, $L_{11-4}$, $L_{11-5}$ Exhaust gas line
$L_{12-1}$, $L_{12-2}$, $L_{12-3}$, $L_{12-4}$, $L_{12-5}$ Exhaust gas exhaust line
$L_{21}$ Integrated exhaust gas line
$L_{31}$ Integrated exhaust gas exhaust line
$V_{11-1}$, $V_{11-2}$, $V_{11-3}$, $V_{11-4}$, $V_{11-5}$ Flow rate control valve

The invention claimed is:

1. An exhaust gas treatment device comprising:
  a first exhaust gas flow path where a first combustion exhaust gas discharged from a first power generation facility flows through;
  a second exhaust gas flow path where a second combustion exhaust gas discharged from a second power generation facility flows through;
  an exhaust gas exhaust flow path disposed by branching off from at least one of the first exhaust gas flow path and the second exhaust gas flow path, and configured to discharge an exhaust combustion exhaust gas, the exhaust combustion exhaust gas including at least a part of at least one of the first combustion exhaust gas flowing through the first exhaust gas flow path and the second combustion exhaust gas flowing through the second exhaust gas flow path;

a nitrogen oxide removing unit configured to remove nitrogen oxide contained in an integrated combustion exhaust gas obtained by integrating the first combustion exhaust gas flowing through the first exhaust gas flow path with the second combustion exhaust gas flowing through the second exhaust gas flow path;

an integrated waste heat recovery unit configured to recover waste heat from the integrated combustion exhaust gas with nitrogen oxide removed by the nitrogen oxide removing unit; and a $CO_2$ recovery unit configured to recover $CO_2$ contained in the integrated combustion exhaust gas by using $CO_2$ absorbing liquid, the waste heat of the integrated combustion exhaust gas being recovered by the integrated waste heat recovery unit.

2. The exhaust gas treatment device according to claim 1, further comprising an exhaust gas waste heat recovery unit configured to recover the waste heat from the exhaust combustion exhaust gas flowing through the exhaust gas exhaust flow path.

3. The exhaust gas treatment device according to claim 1, further comprising a control unit configured to control a flow rate of the first combustion exhaust gas and the second combustion exhaust gas both introduced to the integrated waste heat recovery unit.

4. The exhaust gas treatment device according to claim 3, wherein the control unit controls, based on power loads of the first power generation facility and the second power generation facility, the flow rate of the first combustion exhaust gas and the second combustion exhaust gas both introduced to the integrated waste heat recovery unit.

5. The exhaust gas treatment device according to claim 4, wherein the control unit controls, based on the power outputs of the first power generation facility and the second power generation facility as the power load, the flow rate of the first combustion exhaust gas and the second combustion exhaust gas both introduced to the integrated waste heat recovery unit.

6. The exhaust gas treatment device according to claim 4, wherein the control unit controls the flow rate of the first combustion exhaust gas and the second combustion exhaust gas both introduced to the integrated waste heat recovery unit, based on at least one of the flow rate of the first combustion exhaust gas flowing through the first exhaust gas flow path, the flow rate of the second combustion exhaust gas flowing through the second exhaust gas flow path, and the flow rate of the exhaust combustion exhaust gas flowing through the exhaust gas exhaust flow path, as the power loads.

7. The exhaust gas treatment device according to claim 4, wherein the control unit controls, based on an exhaust gas load calculated using Equation (1) in a case where the power load is equal to or less than a predetermined threshold value, the flow rate of the first combustion exhaust gas and the second combustion exhaust gas both introduced to the integrated waste heat recovery unit;

$$\text{Exhaust gas load (\%)} = \text{Flow rate of the first combustion exhaust gas or the second combustion exhaust gas flowing through the first exhaust gas flowpath or the second exhaust gas flow path to be measured/Full load flow rate of the first combustion exhaust gas or the second combustion exhaust gas flowing through the first exhaust gas flow path or the second exhaust gas flow path} \times 100 \quad \text{Equation (1)}.$$

8. The exhaust gas treatment device according to claim 1, further comprising a control unit configured to adjust the flow rate of the first combustion exhaust gas and the second combustion exhaust gas introduced to the nitrogen oxide removing unit to control temperatures of the integrated combustion exhaust gas to be 300° C. or higher and 400° C. or lower.

9. The exhaust gas treatment device according to claim 1, wherein the nitrogen oxide removing unit is disposed in the integrated waste heat recovery unit.

10. The exhaust gas treatment device according to claim 1, wherein the nitrogen oxide removing unit includes a nitrogen oxide removing catalyst removing nitrogen oxide and a reducing agent injecting unit injecting a reducing agent.

11. The exhaust gas treatment device according to claim 10, further comprising a control unit configured to control supply amount of the reducing agent, based on the gas flow rate and the concentration of nitrogen oxide of the integrated combustion exhaust gas introduced to the $CO_2$ recovery unit.

12. The exhaust gas treatment device according to claim 1, wherein the integrated waste heat recovery unit forms steam for driving a $CO_2$ compression portion by using the waste heat from the integrated combustion exhaust gas with nitrogen oxide removed, the $CO_2$ compression portion compressing $CO_2$ discharged from the $CO_2$ recovery unit, and supplies the formed steam for driving $CO_2$ compression portion to the $CO_2$ compression portion.

13. The exhaust gas treatment device according to claim 1, wherein the integrated waste heat recovery unit forms steam for driving turbine by the waste heat from the integrated combustion exhaust gas with nitrogen oxide removed, and supplies the formed steam for driving turbine to a steam turbine.

14. The exhaust gas treatment device according to claim 13, further comprising a control unit configured to measures the temperature and the gas flow rate of the integrated combustion exhaust gas introduced to the nitrogen oxide removing unit and control at least one of amounts of fuel supplied to combustors of the first power generation facility and the second power generation facility and an amount of steam supplied to the steam turbine, based on the temperature and the gas flow rate which are measured.

15. The exhaust gas treatment device according to claim 1, wherein at least one of the first power generation facility and the second power generation facility includes an existing power generation facility.

16. An exhaust gas treatment method comprising the steps of:

discharging, in a case where at least one of power loads of a first power generation facility and a second power generation facility is less than a predetermined threshold value, at least a part of a first combustion exhaust gas discharged from the first power generation facility and a second combustion exhaust gas discharged from the second power generation facility, the power load of the first power generation facility and the second power generation facility being less than the predetermined threshold value to outside;

integrating the first combustion exhaust gas and the second combustion exhaust gas into an integrated combustion exhaust gas, at least a part of the first combustion exhaust gas and the second combustion exhaust gas being discharged to outside, and removing nitrogen oxide contained in the integrated combustion exhaust gas;

recovering waste heat from the integrated combustion exhaust gas with nitrogen oxide removed; and recovering $CO_2$ contained in the integrated combustion exhaust gas with the waste heat recovered, by using a $CO_2$ absorbing liquid.

* * * * *